United States Patent [19]

Shima et al.

[11] Patent Number: 5,083,285

[45] Date of Patent: Jan. 21, 1992

[54] MATRIX-STRUCTURED NEURAL NETWORK WITH LEARNING CIRCUITRY

[75] Inventors: Takeshi Shima, Sagamihara; Yukio Kamatani, Kawasaki, both of Japan

[73] Assignee: Kabushiki Kaisha Toshiba, Kawasaki, Japan

[21] Appl. No.: 419,768

[22] Filed: Oct. 11, 1989

[30] Foreign Application Priority Data

| Oct. 11, 1988 | [JP] | Japan | 63-255485 |
| Oct. 24, 1988 | [JP] | Japan | 63-267848 |
| Nov. 15, 1988 | [JP] | Japan | 63-286693 |

[51] Int. Cl.⁵ .................................. G06F 15/18
[52] U.S. Cl. ................................ 395/24; 364/807
[58] Field of Search .............. 364/513, 715, 807, 602; 307/201, 494

[56] References Cited

U.S. PATENT DOCUMENTS

| 4,326,259 | 4/1982 | Cooper et al. | 364/715 |
| 4,507,577 | 3/1985 | Kwan | 307/494 |
| 4,752,906 | 6/1988 | Kleinfeld | 364/807 |
| 4,773,024 | 9/1988 | Faggin et al. | 364/513 |
| 4,802,103 | 1/1989 | Faggin et al. | 364/513 |
| 4,866,645 | 9/1989 | Lish | 364/602 |
| 4,901,271 | 2/1990 | Graf | 364/807 |
| 4,962,342 | 10/1990 | Mead et al. | 307/201 |

OTHER PUBLICATIONS

Murray et al., "Asynchronous VLSI Neural Networks Using Pulse-Stream Arithmetic", *IEEE Journal of Solid-State Circuits*, v. 23, N. 3, Jun. 1988, pp. 688-697.
Sage et al., "An Artificial Neural Network Integrated Circuit Based on MNOS/CeD Principles", *Neural Networks for Computing*, 1986, pp. 381-385.
Hirai, "Representation of Control Structures by a Model of an Associative Processor, HASP", *IEEE First International Conference on Neural Networks*, V. II, pp. 447-454.
Raffel et al., "A Generic Architecture for Water-Scale Neuromorphic Systems, " *Prol. IEEE 1st Annual Conference on Neural Networks*, V. II, 1988, pp. 173-180.
Fukushima, K., "A Neural Network for Visual Pattern Recognition", *IEEE Computer*, Mar. 1988, pp. 65-75.
Furman et al., "An Analog CMOS Backward Error-Propagation LSI", *Neural Networks*, vol. 1, Supp. 1, 1988, pp. 1-4.
Furman et al., pp. "An Analog CMOS Backward Error-Propagation LSI, Neural Networks Abstracts of the First Annual Inns Meeting", Boston, vol. 1, Supplement 1, 1988, pp. 1-4.

Primary Examiner—Michael R. Fleming
Assistant Examiner—Roger S. Joyner
Attorney, Agent, or Firm—Foley & Lardner

[57] ABSTRACT

A multi-layer perceptron circuit device using integrated configuration which is capable of incorporating self-learning function and which is easily extendable. The device includes: at least one synapse blocks containing: a plurality of synapses for performing weight calculation on input signals to obtain output signals, which are arranged in planar array defined by a first and a second directions; input signal lines for transmitting the input signals to the synapses, arranged along the first direction; and output signal lines for transmitting the output signal from the synapses, arranged along the second direction not identical to the first direction; at least one input neuron blocks containing a plurality of neurons to be connected with the input signal lines; and at least one output neuron blocks containing a plurality of neurons to be connected with the output signal lines.

20 Claims, 19 Drawing Sheets

MATRIX-STRUCTURED NEURAL NETWORK WITH LEARNING CIRCUITRY

BACKGROUND OF THE INVENTION

1. Field of the Invention

The present invention relates to a multi-layer perceptron circuit device which is widely used in various fields such as recognition problems for letters and voices, optimal control problems for robot motion, general process control problems, and neuro-computers.

2. Description of the Background Art

A perceptron is a neural network invented by Rosenblatt and others in 1940's, which has a multi-layer structure. In general, when a number of layers in this multi-layer structure is large, it is called a multi-layer perceptron.

In general, the multi-layer perceptron has a configuration shown in FIG. 1 which resembles neuron structure in the human brain, for which various mathematical analysis has already been made with regards its information processing capability. For instance, there is a theorem due to Kolmogorov which states that "A perceptron having $n(2n+1)$ neurons can express an arbitrary continuous function with n variables". The parameters of the perceptron are given by combination weights of the synapse connections between neurons, and a self-governing or adaptive type network can be constructed by updating these parameters according to partial differential equations called the learning equations. More recently, D. E. Rumelhart and J. L. McClelland developed the Backward Error Propagation Algorithm (BEP) in which these parameters can be determined by the method of steepest descent.

Refferring now to FIG. 1, a conventional multi-layer perceptron will be described in some detail.

FIG. 1 shows a case of three-layer perceptron comprising the first layer called an input layer which generally contains $n_S$ neurons $S_i$ ($i=1, 2, \ldots, n_S$), the second layer called an intermediate layer which generally contains $n_A$ neurons $A_i$ ($i=1, 2, \ldots, n_A$), and the third layer called an output layer which generally contains $n_R$ neurons $R_i$ ($i=1, 2, \ldots, n_R$). For the sake of simplicity, the FIG. 1 shows the case in which $n_S = n_A = n_R = 3$. Also, in FIG. 1, the combination weights for the synapse connections are designated as $RS_{ij}$ and $RA_{ij}$ ($i, j = 1, 2, 3$). In FIG. 1, signals are propagated from left to right, and an input signal and an output signal of each neuron have in general a mapping relation of a non-linear function having a monotonous change such as a logistic function. Also, the input signals for the neurons of the input layer are assumed to be given externally in forms resembling sensing organ stimulating signals, and each of the neurons $A_i$ and $R_i$ of the intermediate layer and the output layer receives a sum of signals coming in with each signal being weighted by the combination weights $RS_{ij}$ and $RA_{ij}$ associated with each synapse connection. In other words:

$$\text{(input to the neuron } A_i) = \sum_{j=1}^{n} RS_{ji} * (\text{output of } S_j) \tag{1}$$

$$\text{(input to the neuron } R_i) = \sum_{j=1}^{n} RA_{ji} * (\text{output of } A_j) \tag{2}$$

Next, the Backward Error Propagation algorithm will briefly be reviewed.

The Backward Error Propagation algorithm is a learning algorithm for a case in which a teacher signal is given to the output layer, in which weights are updated according to the following equations:

$$R_{ij}(t+\Delta t) = \alpha R_{ij}(t) + \eta \epsilon_j f(y_j(t)) \tag{3}$$

where f is a mapping from an input signal $y_i(t)$ to an output signal, $R_{ij}$ represents either $RS_{ij}$ or $RA_{ij}$, $\alpha$ is called a forgetting factor for which a value 1 corresponds to a case with no forgetting and a value less than 1 corresponds to a case with forgetting with a smaller value indicating faster forgetting, $\eta$ is called a relaxation factor which determines relaxation in the transition according to the above eq. (3) of the weights to the final values, and $\epsilon_j$ is a signal containing error information which will be given by:

$$\epsilon_j = (T_j - f(y_j(t))) f'(y_j(t)) \tag{4}$$

for a case in which the neuron is located in the output layer, and where $T_j$ is a teacher signal and a prime indicates a differential, and:

$$\epsilon_j = f'(y_j(t)) \sum_{k=1}^{n} \epsilon_k R_{jk} \tag{5}$$

for a case in which the neuron is not located in the output layer.

Now, such s conventional multi-layer perceptron and learning equation for its parameters such as the Backward Error Propagation algorithm just described has been practically implemented, such that multi-layer perceptron is usually represented only as diagrammatically as FIG. 1 or by a breadboarded circuit at best, and the algorithm is usually ckecked by either a theoretical calculations or simulation experiments.

In practically implementing the multi-layer perceptron by integrated circuits, there are several problems to be overcome, such as the following.

First of all, there is a problem concerning the arrangement and the wiring of the multi-layer perceptron diagrammatically shown in FIG. 1. Namely, a number of wirings required between two layers containing n neurous is $n^2$, so that as n increases more sophisticated arrangement and wiring are required in order to avoid undesirable situation such as overlapping of wirings. Moreover, since an intergrated circuit can accommodate only a limited number of elements within, it is preferable for each integrated circuit to be easily extendable by connecting other integrated circuits.

Secondly, the possible practical implementation of the Backward Error Propagation algorithm has not been achieved, so that although the use of the method of steepest descent is advocated in this algorithm, how to break this algorithm down to practically implementable blocks have to be worked out.

Thirdly, after the multi-layer perceptron circuit device is constructed, there still is a problem of how to activate an entire device uniformly.

SUMMARY OF THE INVENTION

It is therefore an object of the present invention to provide a practical implementation of the multi-layer perceptron circuit device using integrated configuration which is capable of incorporating self-learning function and which is easily extendable.

According to one aspect of the present invention there is provided a multi-layer perceptron circuit device, comprising: at least one synapse blocks containing: a plurality of synapses for performing weight calculation on input signals to obtain output signals, which are arranged in planar array defined by a first and a second directions; input signal lines for transmitting the input signals to the synapses, arranged along the first direction; and output signal lines for transmitting the output signal from the synapses, arranged along the second direction not identical to the first direction; at least one input neuron blocks containing a plurality of neurons to be connected with the input signal lines; and at least one output neuron blocks containing a plurality of neurons to be connected with the output signal lines.

According to another aspect of the present invention there is provided a multi-layer perceptron circuit device, comprising: at least one synapse blocks, containing: a plurality of unit synapse blocks which are arranged in planar array defined by a first and a second directions; input lines for transmitting signals to the unit synapse blocks, arranged along the first direction; and output lines for transmitting signal from the unit synapse blocks, arranged along the second direction not identical to the first direction; each unit synapse block containing: a plurality of synapses for performing weight calculation on input signals to obtain output signals, which are arranged in planar array defined by a first and a second directions; input signal lines for transmitting the input signals to the synapses, arranged along the first direction; and output signal lines for transmitting the output signal from the synapses, arranged along the second direction not identical to the first direction; at least one input neuron blocks containing a plurality of unit input neuron blocks, each of the unit input neuron blocks containing a plurality of neurons to be connected with the input signal lines of one of the unit synapse blocks; and at least one output neuron blocks containing a plurality of unit output neuron blocks, each of the unit outout neurpon blocks containing a plurality of neurons to be connected with the output signal lines of one of the unit synapse blocks.

Other features and advantages of the present invention will become apparent from the following description taken in conjunction with the accompanying drawings.

DETAILED DESCRIPTION OF THE PREFERRED EMBODIMENTS

Figure 1:
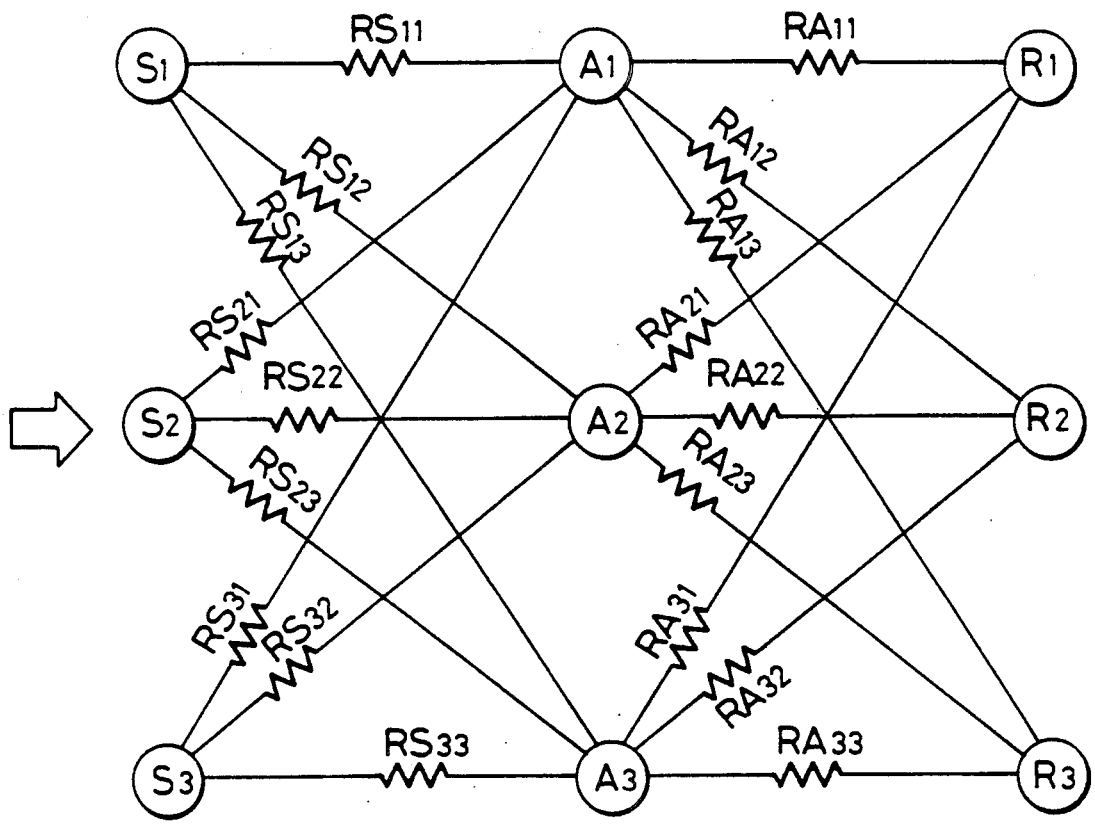
FIG. 1 is a diagrammatic illustration of an example of a conventional multi-layer perceptron.
Figure 2:
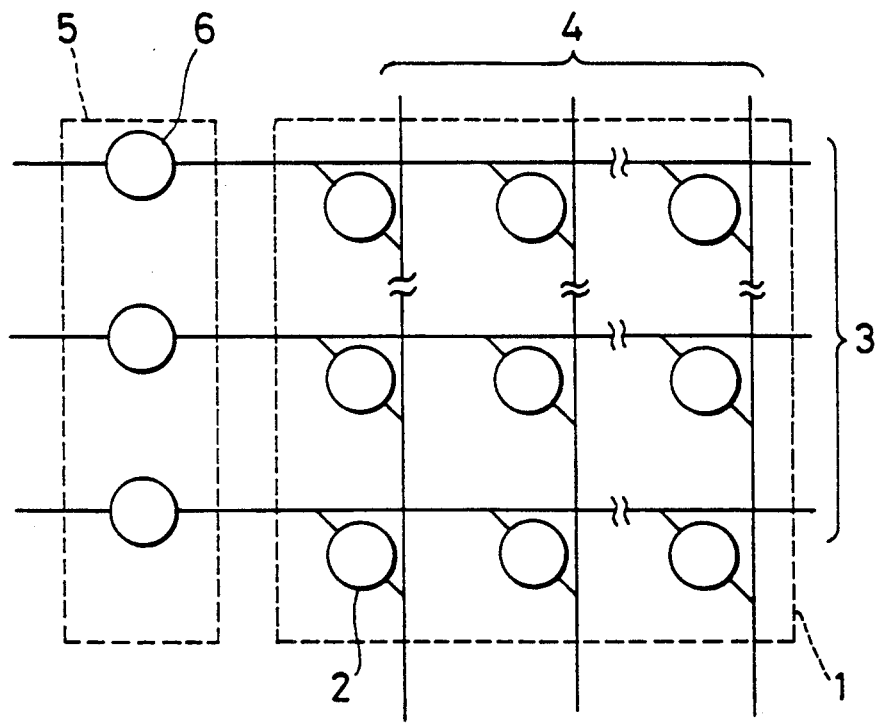
FIG. 2 is a diagrammatic illustration of a general configuration of one embodiment of multi-layer perceptron circuit device according to the present invention.

Referring now to FIG. 2, there is shown a general configuration of a synapse block and a neural block to be used in a multi-layer perceptron circuit device according to the present invention.

As shown in FIG. 2, the synapse blcok 1 which carries out required weight calculations comprises a plurality of synapses 2 arranged in a regular array of n×m size (shown as 3×3 in FIG. 2 for convenience). Here, the array is shown in a shape of square in FIG. 2, but the array can be in other shapes such as rectangle and parallelogram. These synapses 2 are interconnected by n input signal lines 3 arranged in one direction and m output signal lines 4 arranged in another direction perpendicular to the direction of the input signal lines 3, so that each of the synapses 2 taken in a signal from one of the input signal lines 3, performs the weight calculation on this signal with a prescribed weight, and then outputs the result of the weight calculation to one of the output signal lines 4.

Also, adjacent to such a synapse block 1, there is a neuron block 5 which contains n neurons 6 (shown in a number of 3 in FIG. 2 for convenience) arranged along a direction parallel to the direction of the output signal lines 4, one for each of the input signal lines 3. These neurons 6 of the neuron block 5 converts externally given signals coming in to the neuron block 5 into input signals appropriate for the synapses 2, and output such input signals to the signal lines 3.

In the multi-layer perceptron circuit device according to the present invention, such a combination of the synapse block and the neuron block is a basic building unit like a piece of a tile in a tile covered surface, a plurality of which are to be connected together to form a entire device like the tile covered surface. One such a configuration formed by a plurality of the combination f the synapse block and the neuron block is shown in FIG. 3.

Figure 3:
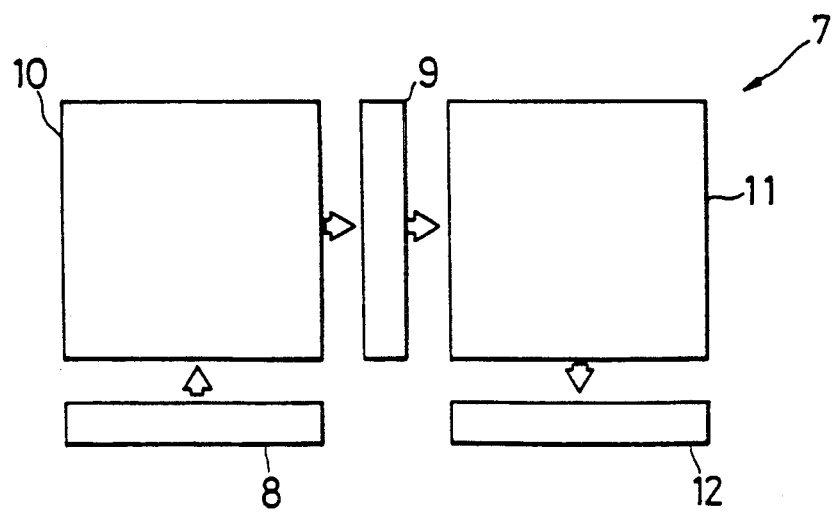
FIG. 3 is a diagrammatic illustration of one specific configuration of the multi-layer perceptron circuit device using the embodiment of FIG. 2.

In FIG. 3, the input neuron blocks 8 and 9 are for providing the input signals to the synapses in the synapse blocks 10 and 11, respectively, as indicated by signal flows represented by arrows. In other words, each of the input neuron blocks 8 and 9 functions with respect to each of the synapse blocks 10 and 11 as the neuron block 5 functions with respect to the synapse block 1 in FIG. 2.

Figure 4:
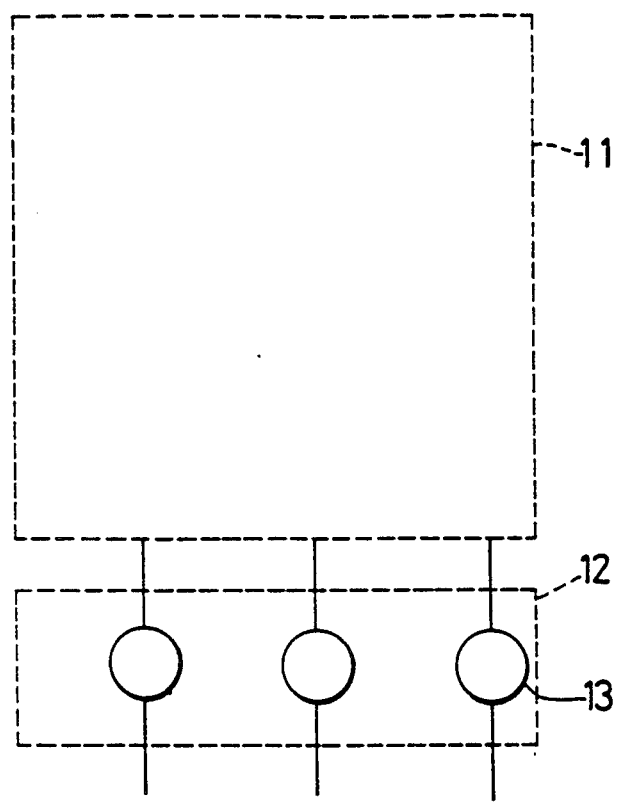
FIG. 4 is a diagrammatic illustration of a portion of the multi-layer perceptron circuit device configuration of FIG. 3.

On the other hand, an output neuron block 12 is for receiving the outout signal from a last synapse block, which is the synapse block 11 in FIG. 3, and outputting the final output signal of the entire multi-layer perceptron circuit device. Thus, as shown in FIG. 4, the output neuron block 12 comprises m neurons 13 (shown in a number of 3 in FIG. 4 for convenience) arranged along a direction parallel to the direction of the input signal lines 3 of the synapse block 11, one for each of the output signal lines 4 of the synapse block 11. These neurons 13 of the output neuron block 12 converts the output signals coming from the synapse block 11 into the final output signals of the entire multi-layer perceptron circuit in an appropriate form, and output such final output signals to the input signals lines 3. In general, in a case such as that in which the multi-layer perceptron circuit device is equipped with a self-learning function, the neurons 6 of the input neuron blocks 8 and 9 and the neuron 13 of the output neuron block 12 have different structures, so that they should not be confused with one another.

It is to be noted that a configuration shown in FIG. 3 incorporates two steps of synapse blocks, inevitable appearing to be arranged linearly along one dircetion, but this is only for the sake of clarity. In fact, the major advantages of the multi-layer perceptron circuit device according to the present invention is that the number of steps of the synapse blocks can be increased arbitrarily, and that they can be arranged in a convenient fashion very easily. This is demonstrated in another configuration shown in FIG. 5, in which the multi-layer perceptron circuit device 14 incorporates four steps of the synapse blocks 20, 21, 22, and 23, connected by the input neuron blocks 15, 16, 17, and 18, and equipped with the output neuron block 19, which are arranged in an overall square shape.

A detail of representative elements of this multi-layer perceptron circuit device 14, namely, the input and output neuron blocks 18 and 19 and the synapse block 23, will now be described.

Figure 6:
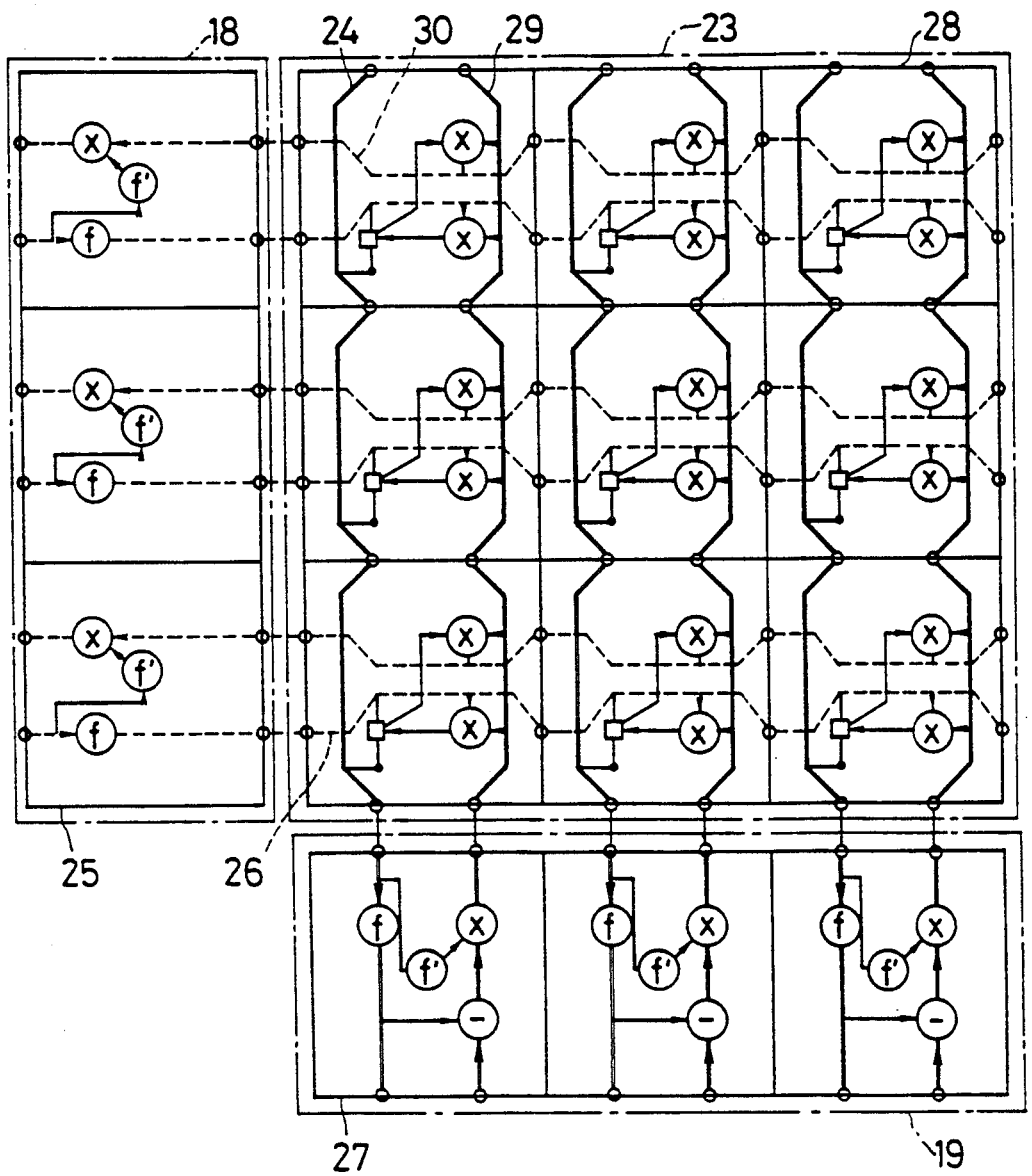
FIG. 6 is a detailed digram for a representative portion of the multi-layer perceptron circuit device configuration of FIG. 5.

This multi-layer perceptron circuit device 14 is a type equipped with the self-learning function which is realized by utilizing the Backward Error Propagation algorithm mentioned in the Description of the Background Art above, in which error signals are propagated in a direction opposite to that of the propagation of weight calculated signaals , i.e., from the output neuron block 19 to the synapse blocks 23, and then to the input neuron block 18, in order to update the weights of each synapse in the synapse block 23. Thus, as shown in FIG. 6, for the synapse block 23 comprising 3×3 synapses 28, the input neuron block 18 for inputting the input signals to the synapse block 23 comprises three neurons 25, and the output neuron block 19 for outputting the output signals from the synapse block 23 and inputting error signals to the synapse block 19 also comprises three neurons 27. To transmit these input, output and error signals, the synapse block 23 is equipped with input signal lines 26 along the horizontal direction, output signal signals 24 along the vertical direction, error signal input lines 29 parallel to the output signal lines 24, and the error signal output lines 30 parallel to the input signal lines 26.

Figure 7:
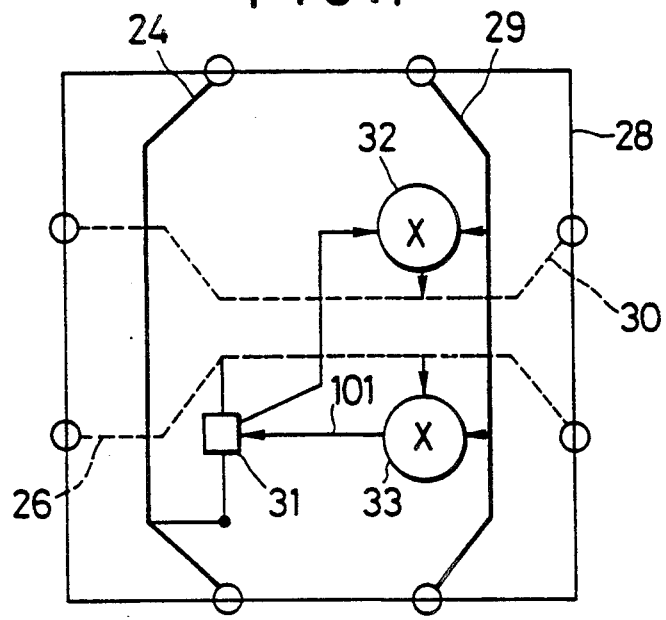
FIG. 7 is a detailed diagram for a synapse in the multi-layer perceptron circuit device configuration of FIG. 5.

Each synapse 28 in detail has a configuration shown in FIG. 7. As shown, the synapse 28 comprises a weight calculation unit 31 and two multipliers 32 and 33. The weight calculation unit 31 takes the input signals from the input signal lines 26 as well as a differential pair signals 101 from one of the multipliers 33, and gives the result of the weight calculation to the output signal lines 24 as well as to another one of the multipliers 32. The multipliers 32 takes the signals from the weight calculation unit 31 as well as the error signals from the error signal input lines 29, and gives the results of multiplication to the error signal output lines 30. The multiplier 33 takes inputs signals from the input signal lines 26 as well as the error signals from the error signal input lines 29, and gives the result of multiplication to the weight calculation unit 31. The multipliers 32 and 33 can be any known type multiplier.

Figure 8:
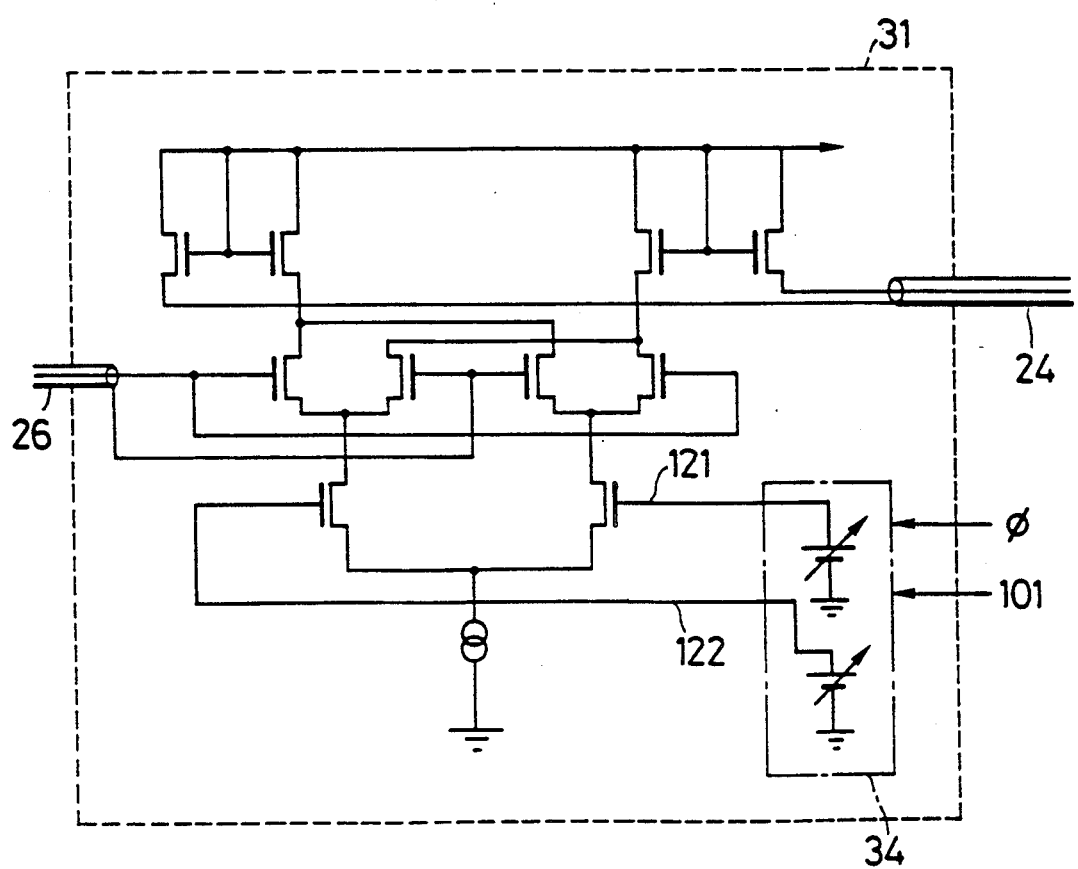
FIG. 8 is a detailed diagram for a weight calculation unit in the synapse of FIG. 7.

A detail of the weight calculation unit 31 is shown in FIG. 8. As shown, the weight calculation unit 31 has a Gilbert multiplier configuration multiplying the input signals from the input signal lines 26 by some multiplication factor corresponding to the weight and outputting the result to the output signal lines 24. The multiplication factor is determined for this Gilbert multiplier configuration by output voltages 121 and 122 of the variable voltage source unit 34 which in turn is controlled by an externally supplied control signal $\phi$ and the differential pair signals 101 from the multiplier 33.

Figure 9:
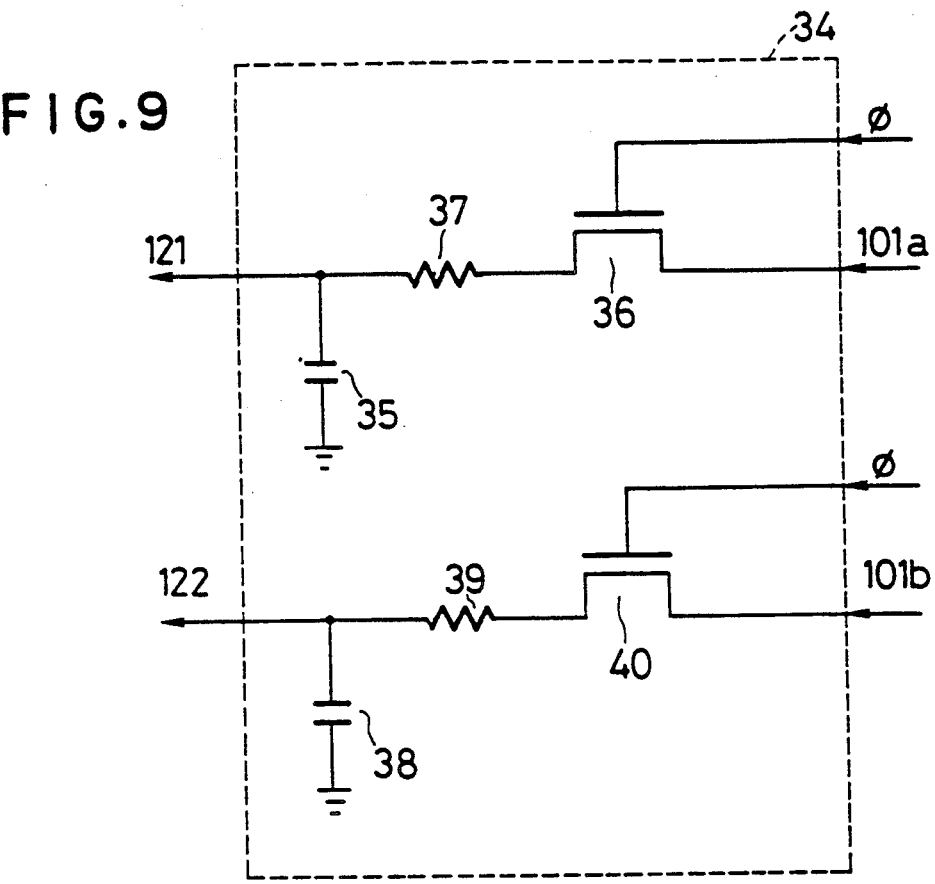
FIG. 9 is a detailed diagram for one possible configuration of a variable voltage source unit in the synapse of FIG. 7.

This variable voltage source unit 34 in detail has a configuration shown in FIG. 9. Namely, the variable voltage source unit 34 comprises one MOS switch circuit 36 which receives the control signal $\phi$ and one component 101a of the differential pair signals 101 at its gate and its drain, respectively, a static capacitor 35, and a resister 37 connected between the source of the MOS switch circuit 36 and the static capacitor 35, which together produce one of the output voltage 121, as well as another MOS switch circuit 40 which receives the control signal $\phi$ and another component 101b of the differential pair signals 101 at its gate and its drain, respectively, a static capacitor 38, and a resister 39 connected between the source of the MOS switch circuit 40 and the static capacitor 38, which together produce one of the ouput voltage 122.

In this configuration, the static capacitors 35 and 38 may be replaced by A/D converters, or combinations of A/D converters with latch circuits, or strongly inductive static capacitors. In the latter case, in particular, the prolonged storing is possible as polarization can be utilized for storing.

It is also possible to make the variable voltage source unit 34 by using EEPROM which can be electrically updated, so as to achieve the prolonged storing of the weights, which can increase a reliability of the multilayer perceptron circuit device 14.

It is also possible to replace CR circuits in the above configuration by integration circuits which actually integrates the values, so that the error signal in the last neuron block can eventually set to zero.

Figure 10:
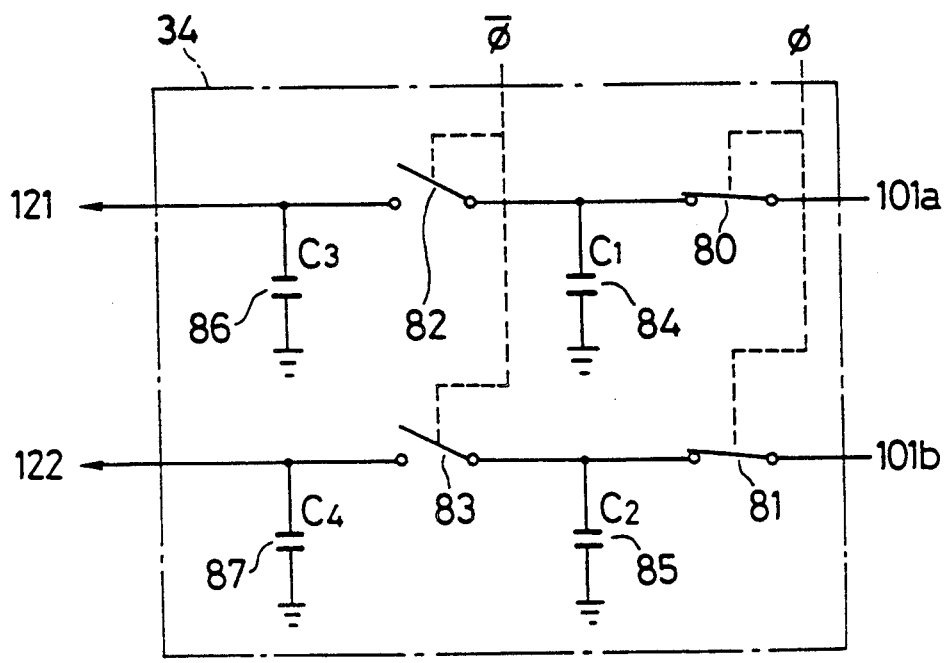
FIG. 10 is a detailed diagram for another possible configuration of a variable voltage source unit in the synapse of FIG. 7.

Alternatively, the variable voltage source unit 34 may have a configuration shown in FIG. 10, which utilizes four switches 82, 83, 84, and 85, controlled by the control signal $\phi$ and its complement $\bar{\phi}$, and four static capacitors 84, 85, 86, and 87. In this configuration, the switches 80 and 81 are closed and the switches 82 and 83 are opened when the control signal $\phi$ is at high level so that the static capacitors 84 and 85 accumulate charges proportional to the components 101a and 101b, respectively, whereas when the control signal $\phi$ is at low level, i.e., when the complement $\bar{\phi}$ is at high level, the switches 80 and 81 are opened and the switches 82 and 83 are closed so that the charges stored in the static capacitors 84 and 85 are given to the static capacitors 86 and 87.

Here, for the static capacitors 84, 85, 86, and 87 of the capacitances C1, C2, C3, and C4, the speed of charge accumulation and release by these capacitors can be adjusted appropriately setting ratios C3/C1 and C4/C2. Namely, amounts of charges, that transfer from the capacitors 84, 85 to the capacitors 86, 87 are proportional to C3/(C1+C3) and C4/(C2+C4), respectively, so that by making the ratios C3/C1 and C4/C2 larger the speed of charge accumulation can be increased. On the other hand, when the components 101a and 101b are equal and the complement $\bar{\phi}$ was at high level so that the capacitors 84 and 86, 85 and 87 are connected, and then the control signal turns to the high level, the charges stored in the capacitors 84 and 85 are released through the lines for components 101a and 101b, the speed of which is faster when the ratios C1/C3 and C2/C4 are greater. Thus, by appropriately setting the ratios C1/C3 and C2/C4, the speed of charge accumulation and release can suitably be adjusted.

Figure 11:
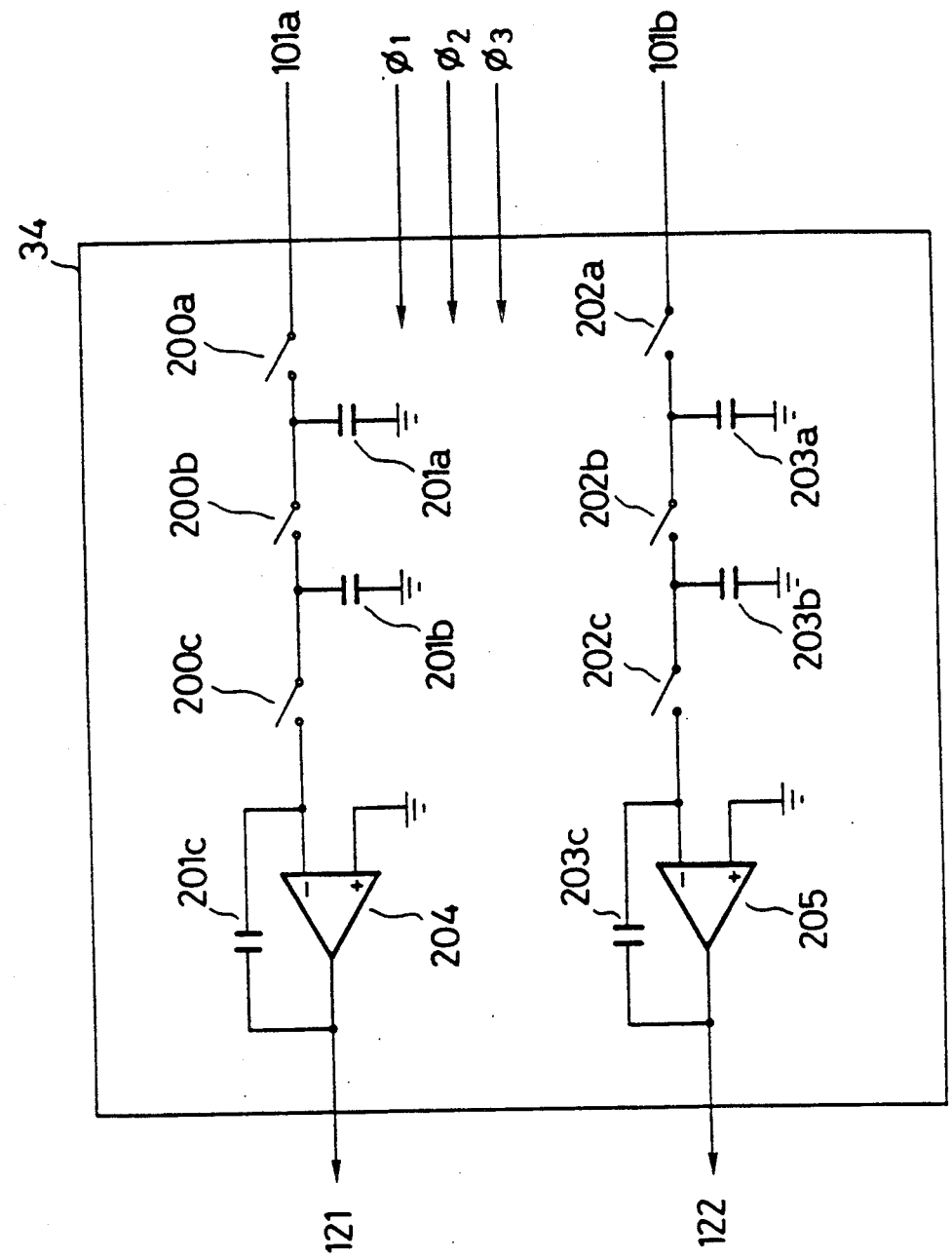
FIG. 11 is a detailed diagram fo still another possible configuration of a variable voltage source unit in the synapse of FIG. 7.

A still another configuration for the vaiable voltage source unit 34 is shown in FIG. 11. This configuration comprises capacitors 201a and 203a that can receive the components 101a and 101b through switches 200a and 202a, respectively, capacitors 201b and 203b that can be connected with the capacitors 201a and 203a through switches 200b and 202b, respectively, and an integrator circuit formed by a capacitor 201c and an operational amplifier 204 which can be connected with the capacitor 201b through a switch 200c and which produces an output voltage 121, and another integrator curcuit formed by a capacitor 203c and an operational amplifier 205 which can be connected with the capacitor 203b through a switch 202c and which produces an output voltage 122. In this configuration, instead of the control signal $\phi$ in the previous configurations, there is provided a first control signal $\phi 1$ for controlling the switches 200a and 202a, a second control signal $\phi 2$ for controlling the switches 200b and 202b, and a third control signal $\phi 3$ for controlling the switches 200c and 202c.

Initially, all the switches are open. Then, the switches 200a and 202a are closed so that the components 101a and 101b are stored in the capacitors 201a and 203a, and then the switches 200a and 202a are opened again, by the first control signal $\phi 1$. Next, the switches 200b and 202b are closed by the second control signal $\phi 2$ so that new update weights can be obtained by adding the charges in the capacitors 201a and 203a to the capacitors 201b and 203b which hold the previously used update weights. This step is included in order to give inertia to the process of updating. Then, the switches 200b and 202b are opened by the second control signal $\phi 2$ and the switches 200c and 202c are closed by the third control signal $\phi 3$ so that all the charges in the capacitors 201b and 203b can be transferred to the capacitors 201c and 203c by means of the integrator circuit formed by the capacitor 201c and the operational amplifier 204 and the integrator circuit formed by the capacitor 203c and the operational amplifier 205. Next, the switches 200c and 202c are opened again by the third control signal $\phi 3$ and the switches 200b and 202b are closed again by the second control signal $\phi 2$ so that the charges in the capacitors 201a and 203a are given to the capacitors 201b and 203b, and then the switches 200b and 202b are closed again by the second control signal $\phi 2$ so that the capacitors 201b and 203b can store the lastest update weights. The advantage of this configuration of FIG. 11 is that with this configuration, the fluctuation of the weights between positive values and negative values can be avoided.

Figure 12:
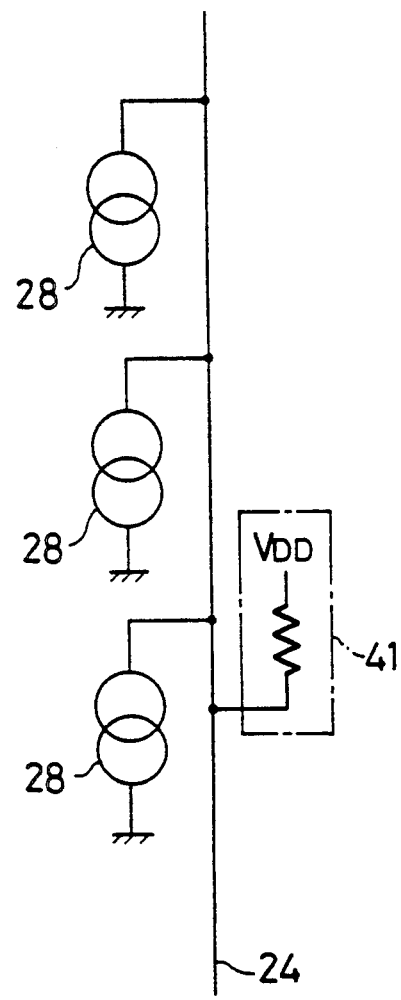
FIG. 12 is a detailed diagram for a current-voltage converter in the synapse of FIG. 7.

Also, though not shown explicitly in FIGS. 6 and 7 above, each of the output signal lines 24 and the error signal output lines 30 is equipped with a current-voltage converter 41 shown in FIG. 12 for one of the output signal lines 24. As shown, the current-voltage converter 41 comprises a resister with one end connected to a constant voltage source $V_{DD}$ and another end connected to one of the output signal lines 24, which converts a total of the currents coming into one of the output signal lines 24 from the synapses 28 represented as current sources in FIG. 12 into a corresponding voltage on that output signal line 24.

Figure 13:
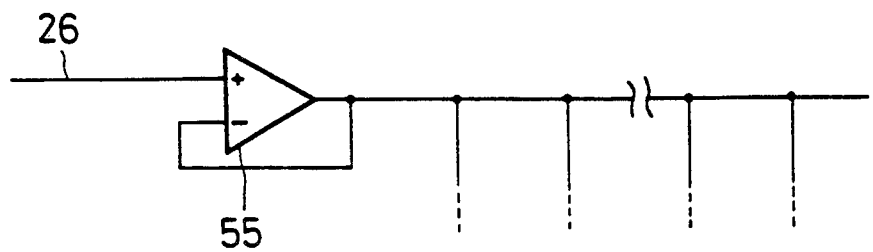
FIG. 13 is a detailed diagram for a signal dissipation compensator means in the synapse of FIG. 7.

Similarly, though not shown explicitly in FIGS. 6 and 7 above again, each of the input signal lines 26 and the error signal input lines 29 is equipped with a signal dissipation compensator means 55 shown in FIG. 13 for one of the input signal lines 26. As shown, the signal dissipation compensator means 55 comprises an amplifier configuration which amplifies and thereby converts an impedance of, the input signals on that input signal line 26.

Figure 14:
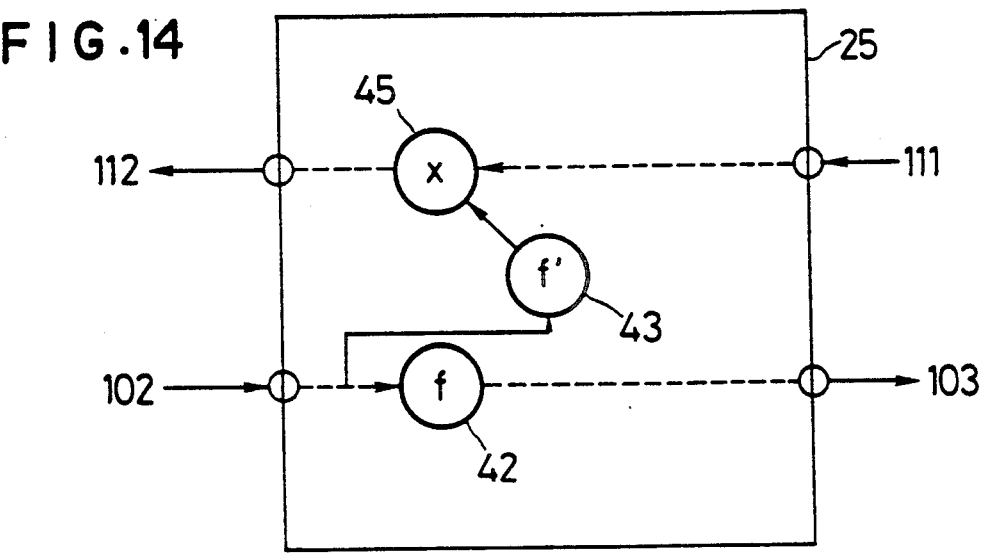
FIG. 14 is a detailed diagram for a neuron of an input neuron block in the multi-layer perceptron circuit device configuration of FIG. 5.

Each neuron 25 of the input neuron block 18 in detail has a configuration shown in FIG. 14. As shown, the neuron 25 comprises a function converter unit 42 which performs the conversion by a logistic function on incoming signals 102 to obtain outgoing signal 103 to be given to the input signal lines 26 of the synapses 28, a differential function converter unit 43 also receiving the incoming signal 102 which actually realizes the self-learning functions of the multi-layer perceptron circuit device 14, and a multiplier 45 for receiving the output of the differential function converter unit 43 as well as incoming error signal 111 from the error signal output lines 30 of one synapse 28 and outputting the result as an outgoing error signal 112 to be given to the error signal output line 30 of another synapse 28.

Figure 15:
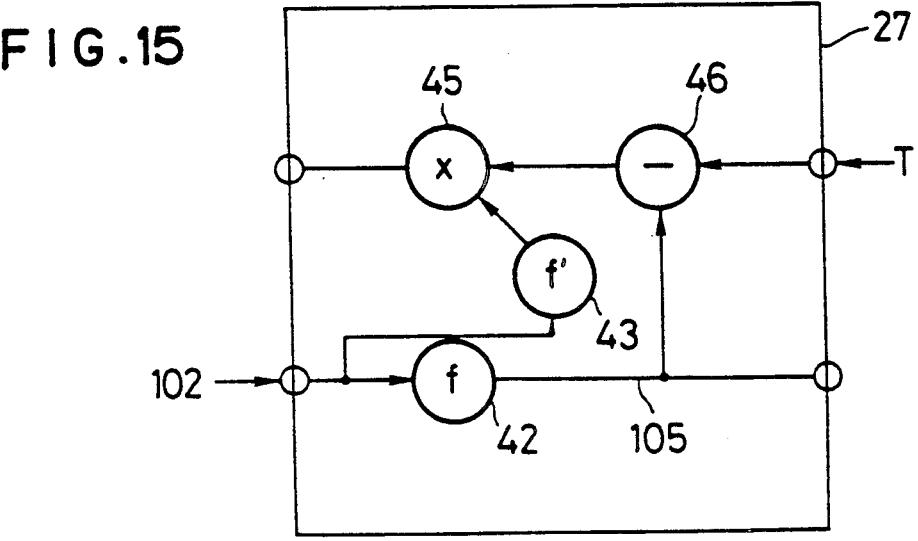
FIG. 15 is a detailed diagram for a neuron of an output neuron block in the multi-layer perceptron circuit device configuration of FIG. 5.

On the other hand, each neuron 27 of the output neuron block 19 in detail has a configuration shown in FIG. 15. As shown, the neuron 27 also comprises the same function converter unit 42 which performs the conversion by a logistic function on incoming signals 102 from the output signal lines 24 of the synapses 28 to obtain an output 105, the same differential function converter unit 43 also receiving the incoming signal 102 which actually realizes the self-learning function of the multi-layer perceptron circuit device 14, and the same multiplier 45. In addition, the neuron 27 also comprises a subtractor 46 which receives an externally supplied teacher signal T as well as the output 105 of the function converter unit 42 and gives the result of subtraction to the multiplier 45, so that the multiplier 45 receives the output of the differential function converter unit 43 and the output of the subtractor 46 and outputs the result as an outgoing error signal 112 to be given to the error signal input line 29 of the synapse 28.

Figure 16:
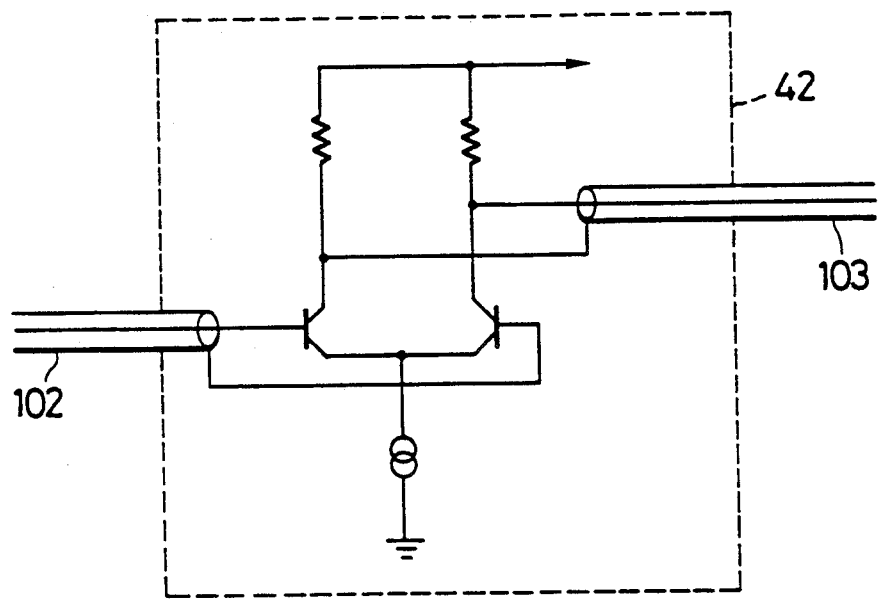
FIG. 16 is a detailed diagram for a function converter in the neurons of FIGS. 14 and 15.
Figure 17:
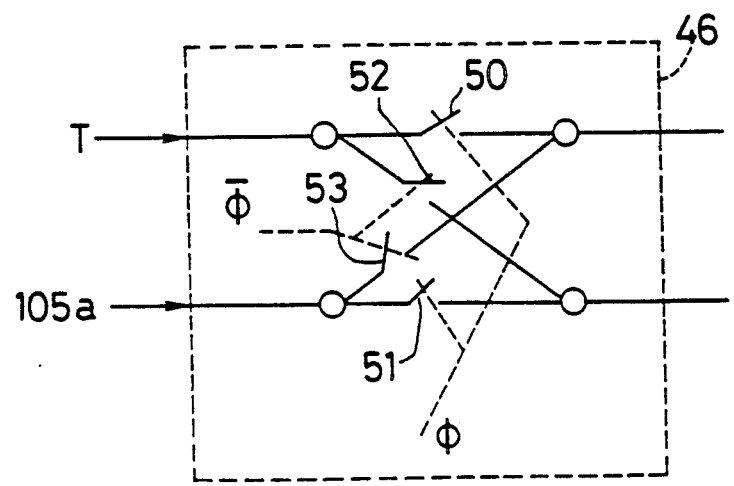
FIG. 17 is a detailed diagram for a subtractor in the neuron of FIG. 15.

The function converter unit 42 in these neurons 25 and 27 in detail has a configuration of a differential amplifier, as shown in FIG. 16. The multiplier 45 in these neurons 25 and 27 can be any known type of multipler such as that using the Gilbert multiplier and the current mirror circuit. Also, as shown in FIG. 17, the subtractor 46 of the neuron 27 in detail has a configuration of a pair of coupled switches 50, 51, and 52, 53, which are controlled by the control signal $\phi$ mentioned above and its complement $\bar{\phi}$, in order to perform subtraction of the teacher signal T and one component 105a of the output 105 of the function converter unit 42.

The differential function converter unit 43 of these neurons 25 and 27 has the following detail configuration.

Figure 18:
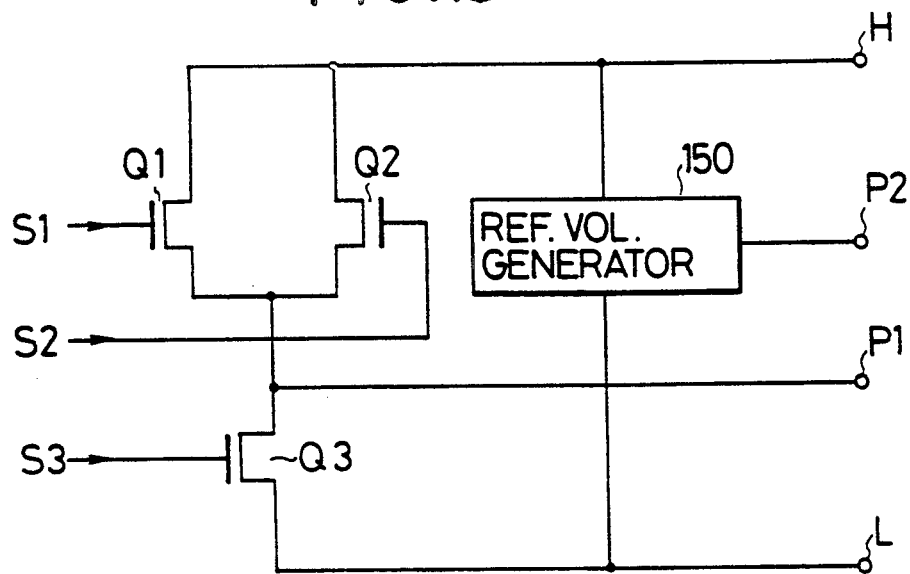
FIG. 18 is a detailed diagram for one possible configuration of a differential function converter in the neurons of FIGS. 14 and 15.

FIG. 18 schematically shows one possible configuration for the differential function converter unit 43 which comprises two MOSFETs Q1 and Q2 which have their drains connected to a high voltage terminal H, and their sources connected to a first output terminal P1, and another MOSFET Q3 which functions as a load by utilizing the drain current-voltage characteristic of FET, whose drain is also connected to the first output terminal P1, and whose source is connected to a low voltage terminal L. The gates of the MOSFETs Q1 and Q2 are respectively fed with a function signal S1 and its complimentary signal S2, such as those shown in FIG. 19 for a sigmoid function and its complement, whereas the MOSFET Q3 is fed with a bias voltage S3 which determines the load characteristic of the MOSFET Q3. In addition, there is a reference voltage generator 150 for providing a reference voltage with respect to a combination of the MOSFETs Q1, Q2, and Q3, which is connected between the high voltage terminal H and the low voltage terminal L and from which a second output terminal P2 stems.

Figure 19:
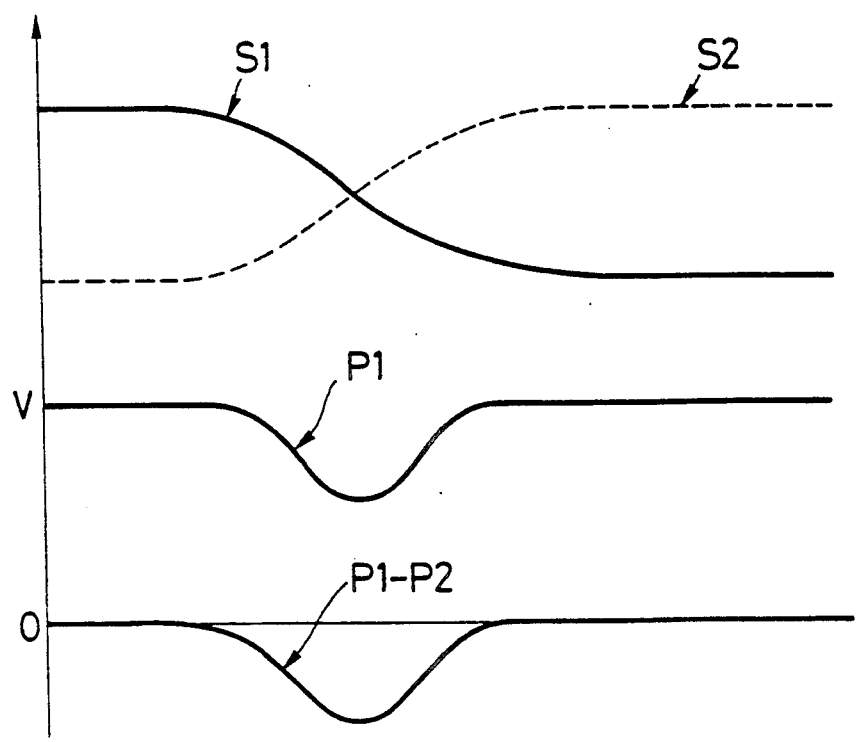
FIG. 19 is a graph showing sigmoid function and its complement to be inputted to the differential function converter of FIG. 18 as well as outputs of the differential function converter of FIG. 18.

In such a configuration, if the sigmoid function is set to be at a higher value at the beginning as shown in FIG. 19, then there is a saturated current at the source of the MOSFET Q1, while there is almost no current at the source of the MOSFET Q2, since the MOSFET Q3 tends to keep a sum of the source currents of the MOSFETs Q1 and Q2 constant, so that only the source current of the MOSFET Q1 is given to the MOSFET Q3 and the output of the first output terminal P1 maintains a constant level determined by this saturated source current of the MOSFET Q1. Then, as shown in FIG. 19, as the value of the sigmoid function S1 begins to decrease from the higher value, the source currents of both MOSFETs Q1 and Q2 begins to be given to the MOSFET Q3, but the load current of the MOSFET Q3 actually decreases so that the output of the first output terminal P1 also decreases. When the value of the sigmoid function S1 further decreases, there appears a saturated current at the source of the MOSFET Q2, while there is almost no current at the source of the MOSFET Q1, and the output of the first output terminal resumes the initial constant value, as shown in FIG. 19.

As can be seen from FIG. 19, the output of the first output terminal P1 becomes lowest when the values of the sigmoid function S1 and its compliment S2 are equal. The curve thus obtained varies slightly depending on the types of transistors and load to be used, but substantially approximates the derivative of the sigmoid function, which will be utilized with appropriate coefficients.

Now, as shown in FIG. 19, the output of the first output terminal P1 is DC biased by a constant voltage V, so that when the referential voltage generator 150 is made to produce this voltage V which is utilized to offset the DC bias of thed first output terminal P1, an approximate differential output, which has a zero value when the sigmoid function is substantially flat, can be obtained.

Figure 20:
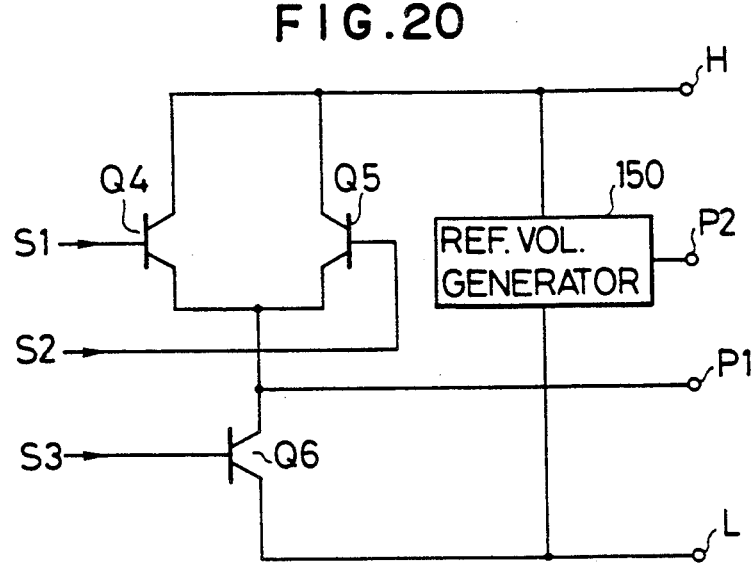
FIG. 20 is a detailed diagram for another possible configuration of a differential function converter in the neurons of FIGS. 14 and 15.

Alternatively, a configuration shown in FIG. 20 may be employed, in which the MOSFETs Q1, Q2, and Q3 in FIG. 18 are replaced by bipolar transistors Q4, Q5, and Q6, respectively. It should be obvious that the use of different type of transistor elements does not affect the operation of the differential function converter unit 43. Actually, the configuration of FIG. 20 which uses bipolar transistors produces somewhat different curves than the configuration of FIG. 18 which uses MOSFETS, so that an appropriate one of these configurations should be selected.

Similarly, the transistor Q3 or Q6 used as loads in FIGS. 18 and 20 may be replaced by resisters without affecting the operationn of the differential function converter unit 43.

Figure 21:
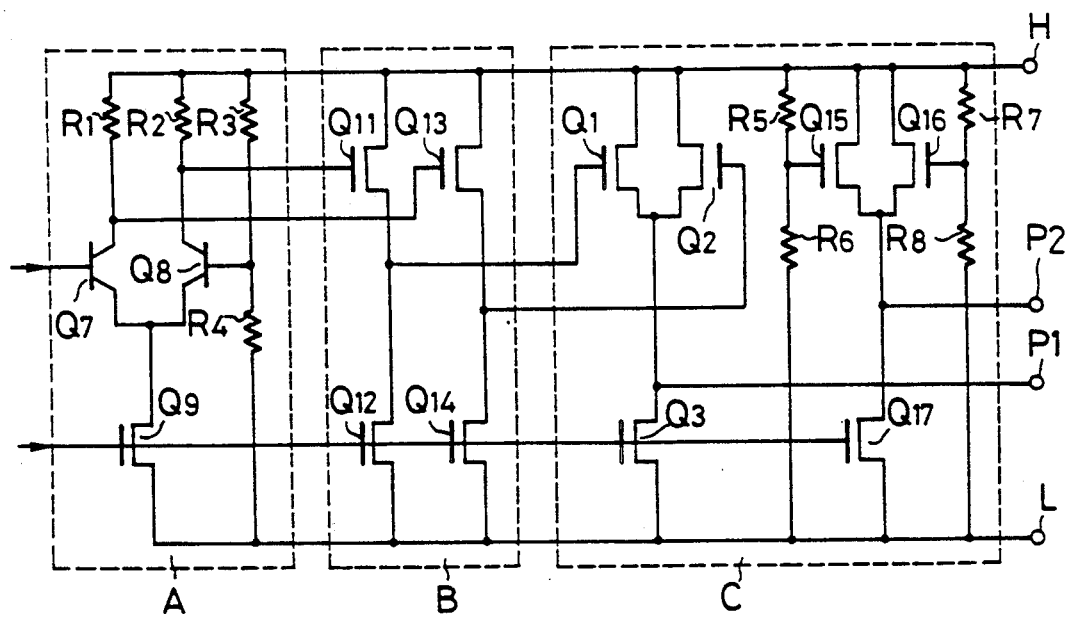
FIG. 21 is a detailed diagram for still another possible configuration of a differential function converter in the neurons of FIGS. 14 and 15.

FIG. 21 shows still another possible configuration for the differential function converter unit 43, which also incorporates a differential amplifier for generating the sigmoid functions S1 and a level shift circuit for this differential amplifier.

Namely, a block A in FIG. 21 is a differential amplifier which uses bipolar transistors Q7 and Q8 for differential amplification, and a FET Q9 for loading. The base of the transistor Q8 is fed with a constant voltage obtained by two resisters R3 and R4 dividing the voltage between the high voltage terminal H and the low voltage terminal L, whereas the base of the transistor Q7 is fed with an input signal whose level is linearly changed such that the sigmoid function and its complement can be obtained at the resisters R1 and R2 connected between the high voltage terminal H and connectors of the transistors Q7 and Q8, respectively.

A block B in FIG. 21 is a level shift circuit made by a pair of source follower circuits comprising FETs Q11, Q12 for the transistor Q8, and FETs Q13, Q14 for the transistor Q7, which feeds the level shifted sigmoid function and its complement to the FETs Q1 and Q2.

A block C in FIG. 21 is differential functional converter unit 43 itself incorporation the same FETs Q1, Q2, and Q3 as in FIG. 18. Furthermore, in FIG. 21, the reference voltage generator 150 is actually constructed by FETs Q15, Q16, and Q17 which are substantially equivalent and similarly connected with each other as the FETs Q1, Q2, and Q3, in which the gate of the FET Q15 is fed with a voltage produced by the resisters R5 and R6 connected between the high voltage terminal H and the low voltage terminal L that can make the source current of the FET Q15 saturate, while the gate of the FET Q16 is fed with a voltage produced by the resisters R7 and R8 also connected between the high voltage terminal H and the low voltage terminal L that can make the source current of the FET Q16 almost null. The second output terminal P2 is formed by connecting the sources of the FETs Q15 and Q16. All of the FETs Q9, Q12, Q14, and Q17 are supplied with the bias voltages S3 applied to the FET Q3.

In this configuration of FIG. 21, the base of the transistor Q8 may be directly connected to the collector of the transistor Q7, in which case the resisters R3 and R4 can be removed, so that the circuit simplifies. Also, the voltages applied to the gates of the FETs Q15 and Q16 may be produced by level shift circuits using transistors instead of resisters. Moreover, it is also possible to omit the FET Q16 and connect FETs Q15 and Q17 directly, with the FET Q15 saturated, without affecting the operation as the reference voltage generator.

It is to be noted that all the signals in the synapses 28 and the neurons 25 and 27 has been in a form of differential pair signals, so that the undesirable effect due to the common phase noises caused by the fluctuation of the voltage from the voltage source can be eliminated.

Now, the operation of this multi-layer perceptron circuit device 14 will be explained.

First, when the input signals are given to the weight calculation unit 31 of the synapse 28 from the input signal line 26, the weight calculation of multiplying the input signals by the multiplication factor of the synapse 28 is performed. Here, the multiplication factor of the synapse 28 represents the memory content of the synapse 28.

As mentioned above, this multiplication factor of the synapse 28 is controlled by the variable voltage source unit 34 in the weight calculation unit 31. Namely, the multiplier 33 calculates the differential pair signals 101 from the input signal from the input signals line 26 and the error signal from the error signal input line 29, and the variable voltage source unit 34 produces the output voltage 121 by changing the charge accumulated in the static capacitor 35 by means of the one compnent 101a of the differential pair signals 101, which is controlled by the MOS switch circuit 36 using the control signal $\phi$. Likewise, the variable voltage source unit 34 also produces the outut voltage 122 changing the charge accumulated in the static capacitor 38 by means of the another component 101b of the differential pair signals 101, which is controlled by the MOS switch circuit 40 using the same control signal $\phi$. The signal $\phi$ is a pulsed signal with a constant pulse width, such that when this control signal $\phi$ is at a high level the components 101a and 101b of the differential pair signals 101 is applied to the static capacitors 35 and 38, respectively. The output voltage 121 and 122 of the variable voltage source unit 34 are then given to the Gilbert multiplier configuration in the weight calculation unit 31 such the change in the difference between the potential levels of the two static capacitors 35 and 38 provides the change in the multiplication factor for the Gilbert multiplier configuration.

By this part of the operation the calculation is performed for the second term on right hand side of the aforementioned expression for the Backward Error Propagation algorithm:

$$R_{ij}(t+\Delta t) = \alpha R_{ij}(t) + \eta \epsilon_j f(y_i(t)) \quad (3)$$

where f is a mapping from an input signal $y_i(t)$ to an output signal, $R_{ij}$ represents either $RS_{ij}$ or $RA_{ij}$, $\alpha$ is called a forgetting factor for which a value 1 corresponds to a case with no forgetting and a value less than 1 corresponds to a case with forgetting with a smaller value indicating faster forgetting, $\eta$ is called a relaxation factor which determines relaxation in the transition according to the above eq. (3) of the weights to the final values, and $\epsilon_j$ is a signal containing error information which will be given by:

$$\epsilon_j = (T_j - f(y_j(t)))f'(y_j(t)) \quad (4)$$

for a case in which the neuron is located in the output layer, and where $T_j$ is a teacher signal and a prime indicates a differential, and:

$$\epsilon_j = f'(y_j(t)) \sum_{k=1}^{n} \epsilon_k R_{jk} \quad (5)$$

for a case in which the neuron is not located in the output layer.

As will be explained further below, this updating of the weight of the synapse 28 is performed in such a manner that the absolute value of the error signal is decreased, by means of the subtractor 46 of the neuron 27 of the output neuron block 19. The result of the weight calculation by the weight calculation unit 31 is subsequently given to the output signal line 24, and the total of the signals given to the output signal line 24 in turn is converted into a corresponding voltage by means of the current-voltage converter 41. The resulting output signal is then transmitted through the output signal line 24 to the neighboring neuron block, which may be any one of the input neuron blocks 16, 17, 18, or the output neuron block 19.

Next, in each neuron, whether it is one in the input neuron blocks 16, 17, 18, or that in the output neuron block 19, the conversion by the logistic function which has a monotonous and nonlinear characteristic is performed on the incoming signals 102 at the function converter unit 42. As mentioned above, the function converter unit 42 achieves this by using the differential amplifier configuration. Here, the monotonous and non-linear function conversion can in principle be done by other configuration, but the use of the differential amplifier configuration facilitates an easy realization of a saturation characteristic which is one of the distinctive feature of the neuron operation.

In a case of the neuron 27 of the output neuron block 19, there is also the subtractor 46 which produces the error signal as a pulse signal representing the error in terms of a difference between the output 105 of the function converter unit 42 and the teacher signal T. This error signal has a pulsed height proportional to the difference between the output 105 of the function converter unit 42 and the teacher signal T, which is obtained by closing the coupled switches 50, 51 and opening the coupled switches 52, 53 when the control signal $\phi$ is at the high level, and opening the coupled switches 50, 51 and closing the coupled switches 52, 53 when the control signal $\phi$ is at the low level. This manner of representing the error by the pulse height makes it possible to eliminate the common mode noises due to the fluctuation of the voltage source. The error signal thus obtained corresponds to the first term of the eq. (4) above.

The multiplier 45 of the neuron 25 or 27 takes this error signal from the subtractor 46 or from adjacent synapse block, and the output of the differential function converter unit 43 which represents the result of the conversion by the derivative of the logistic function used by the function converter unit 42, and multiply them together to obtain its output corresponding to the expression of eq. (4) above which is subsequently given to the next synapse block as the error signal.

Then, the error signal transmitted through the error signal input line 29 to the synapse block is utilized in updating the weights of the synapses. Namely, the error signal from the error signal input line 29 is given to the multiplier 32 at which it is multiplied by the weight of the synapse at that time, and then given to the error signal output line 30. At the error signal output line 30, the total of the error signal is converted into a corresponding voltage by the current-voltage converter 41, which corresponds to the factor involving $\Sigma$ in eq. (5) above.

This voltage from the error signal output line 30 is then given to the multiplier 45 of the next neuron which also receives the output of the differential function converter unit 43 of that neuron which represents the result of the conversion by the derivative of the logistic function used by the function converter unit 42 of that neuron, and multiply them and multiplies them together to obtain the error signal according to the eq. (5) above. The obtained error signal is then transmitted to the next synapse and the process continues on.

In this embodiment, one of the advantage is the fact that as the synapses and neurons are arranged in highly ordered manner, the wirings among these elements can be simplified. Namely, without the orderly arrangement of this embodiment it is likely that the wirings becomes multiple layered, whereas in this embodiment the wirings are at most double layered, regardless of the size of the multi-layer perceptron circuit device.

Moreover, the configuration of this embodiment facilitates an easy extension of the multi-layer perceptron circuit device. That is, by arranging the synapse blocks and neuron blocks in spiral shape or in zigzag shape an arbitrary large multi-layer perceptron circuit device can be constructed.

There are several variations possible in this embodiment.

First of all, the differential function converter 43 and the multiplier 45 in the neurons of the input neuron blocks may be omitted.

Furthermore, it is preferable to operate the function converter 42 and the differential function converter 43 in a following manner.

Figure 22:
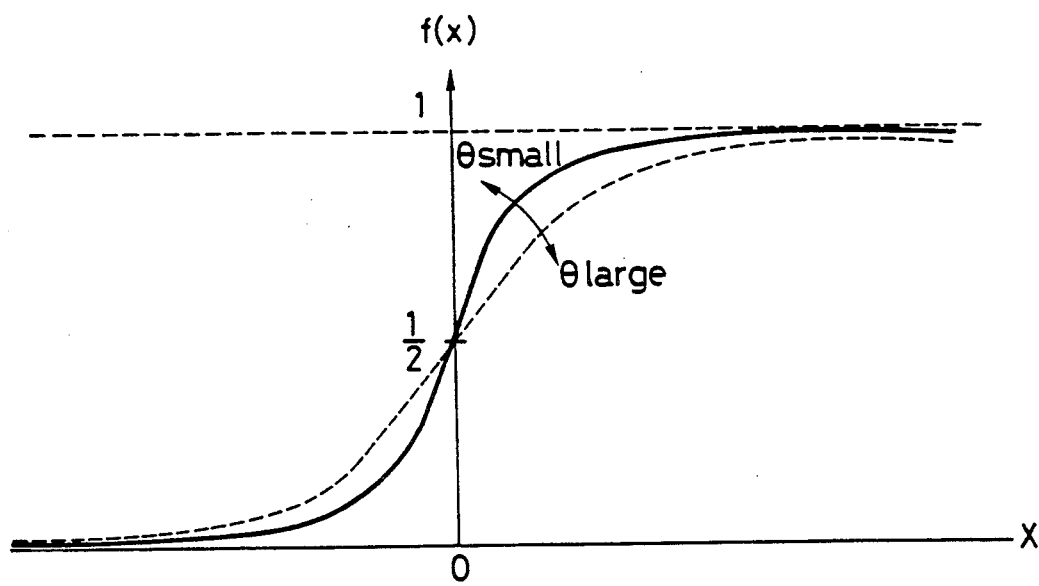
FIG. 22 is a graph showing one possible monotonous nonlinear function to be inputted to the differential function converter in the neurons of FIGS. 14 and 15.
Figure 23:
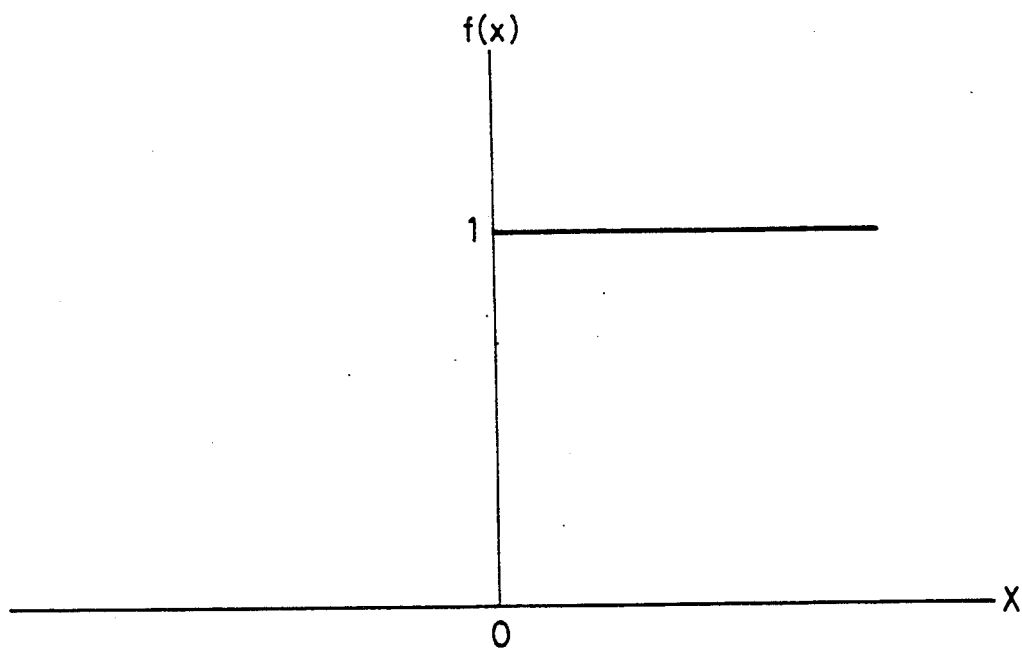
FIG. 23 is a graph showing another possible monotonous nonlinear function to be inputted to the differential function converter in the neurons of FIGS. 14 and 15.
Figure 24:
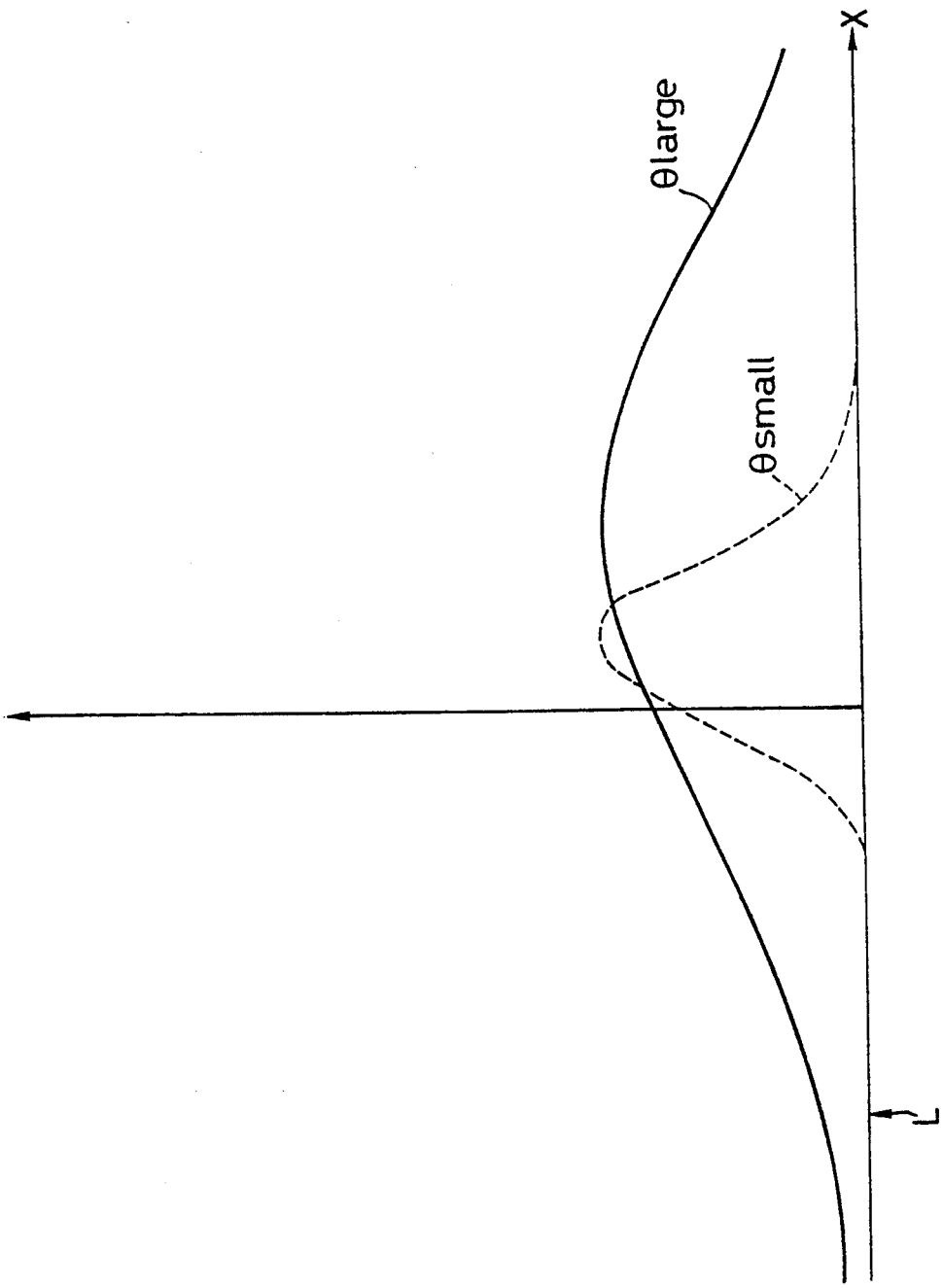
FIG. 24 is a graph qualitatively showing curves for a term in an equation for determining the weights in the self-learning algorithm in two different cases.

Namely, the monotonous and nonlinear function to be utilized in the self-learning process in the above embodiment in general has a form:

$$f(x) = \frac{1}{1 + \exp(-x/\theta)} \quad (6)$$

where x and $\theta$ are independent variables, which is depicted in FIG. 22. As indicated in FIG. 22, different values of $\theta$ result in different curves, which includes an extreme limit of a form:

$$f(x) = \begin{cases} 0 & (x < 0) \\ 1 & (x \geq 0) \end{cases} \quad (7)$$

which can be regarded as f(x) of eq. (6) at a limit $\theta \to 0$. Now, in the process of self-learning using such a function, the time required for the convergence of the process depends on the initial condition very sensitively, but is usually unknown when the process begins. As a result, a very slow learning often occurs. To see this situation more clearly, FIG. 24 shows a term f(x)·f'(x) for two different values of $\theta$ qualitatively. As can be seen from FIG. 24, the curve for this term becomes broadened as $\theta$ increases. Now, suppose a point marked as L is where the self-learning process started. Then, in a case of $\theta$ small, the term f(x)·f'(x) is nearly zero so that the second term in right hand side of the eq. (3) above is also nearly zero which implies that $R_{ij}$ is hardly changed. Thus, if the self-learning process starts with the initial conditions for which the term f(x)·f'(x) is nearly zero, the self-learning process progresses very slowly, or in other words, the convergence of process is delayed. On the other hand, in a case of $\theta$ large, the term f(x)·f'(x) has a non-zero value at the point L so that the self-learning process can make a significant progress from the start. However, the value of $R_{ij}$ that can eventually be attained by $\theta$ small case is not attainable by $\theta$ large case, as the peak value of the curve for the term f(x)·f'(x) is less in $\theta$ large case than in $\theta$ small case.

This analysis suggests a possible solution of starting the self-learning process with a large $\theta$ and gradually decreasing $\theta$ as the process progresses, so that the weights can be updated to the desired values without the delay of convergence of the process.

This can be implemented in the above embodiment by making the following modifications.

Figure 25:
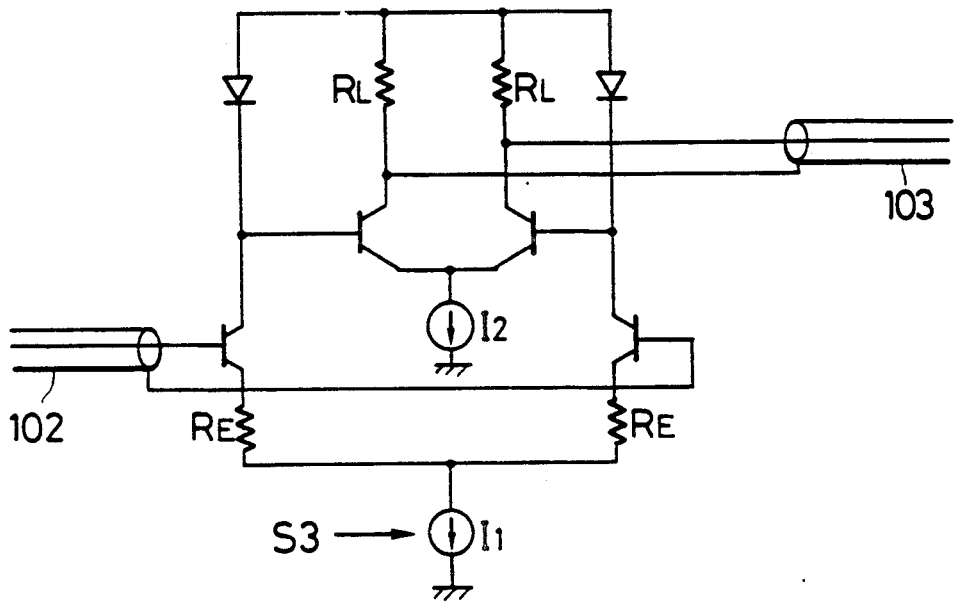
FIG. 25 is a detailed diagram for one possible modification of the function converter of FIG. 16.

First, a differential amplifier configuration of the function converter 42 shown in FIG. 16 should be replaced by a so called Gilbert gain cell configuration shown in FIG. 25 which includes a variable current source $I_1$ connected with the input side transistors through resisters $R_E$ in addition to a constant current source $I_2$ connected with the output side transistors, where the variable current source $I_1$ is controlled by the same bias voltage S3 that controls the differential function converter 43. For such a gain cell configuration, there is a relationship among the gain of the configuration, resistance of the output side load resisters $R_L$, resistance of the input side load resisters $R_E$, current of the variable current source $I_1$, and current of the constant current source $I_2$ of a form:

$$\text{Gain} = \frac{R_L}{R_E} \cdot \frac{I_2}{I_1} \tag{8}$$

and it is known to be possible with such a gain cell configuration to control the gain by adjusting the variable current source $I_1$ without affecting the amplitude of the output.

Figure 26:
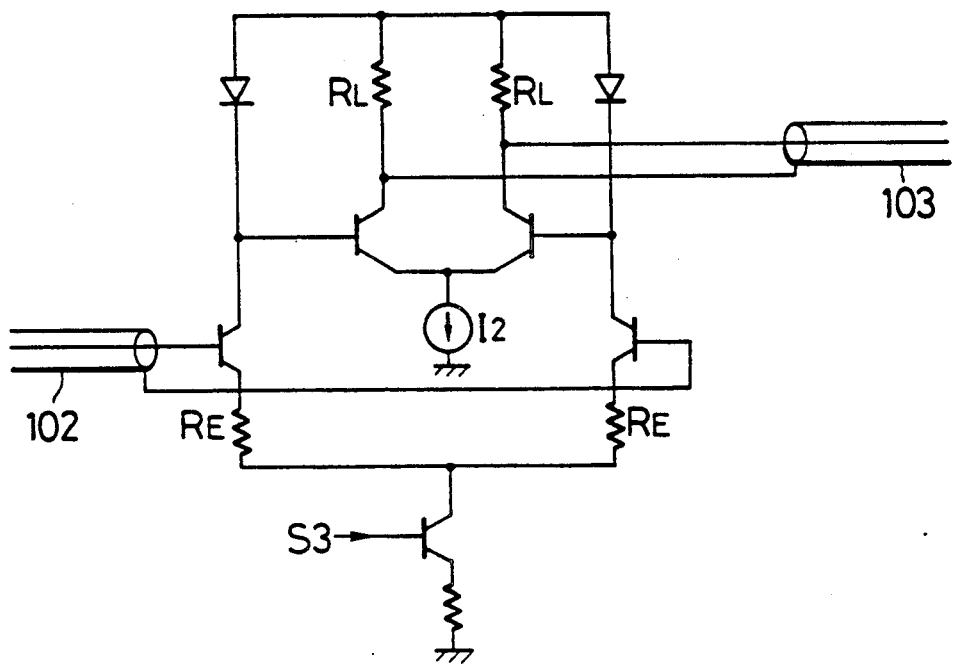
FIG. 26 is a detailed diagram for another possible modification of the function converter of FIG. 16.
Figure 27:
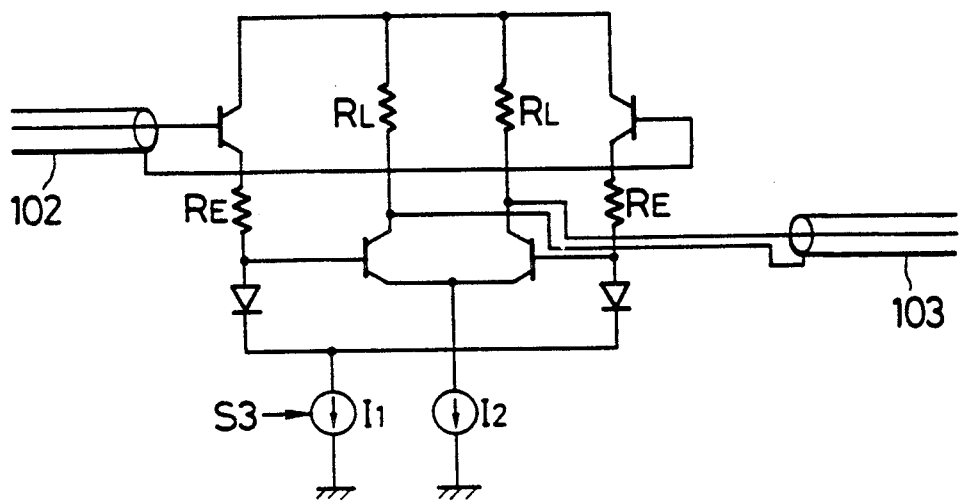
FIG. 27 is a detailed diagram for another possible modification of the function converter of FIG. 16.
Figure 28:
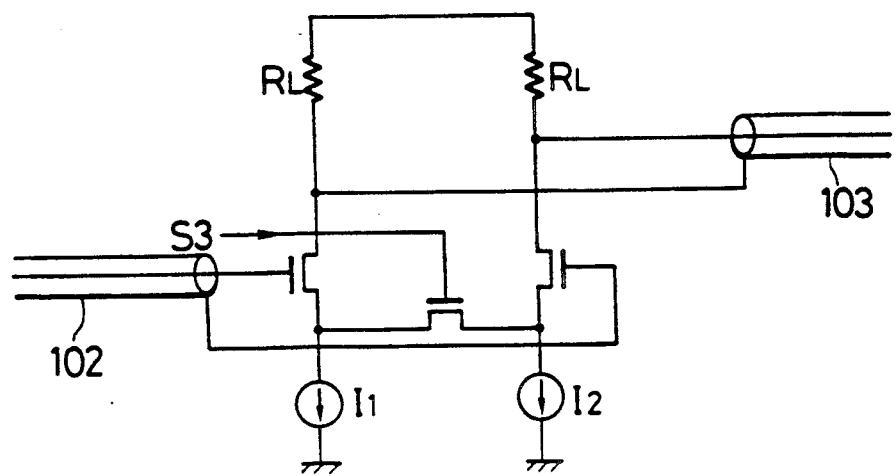
FIG. 28 is a detailed diagram for another possible modification of the function converter of FIG. 16.

The gain cell configuration appropriate for the function converter 42 may also be realized differently from FIG. 25, such as those shown in FIGS. 26 to 28. In a configuration of FIG. 26, the variable current source $I_1$ is provided by a transistor coupled with a grounded resister, whereas in a configuration of FIG. 27, the order of diode and transistor-resister combination on the input side is reversed, and in a configuration of FIG. 28 the MOSFETs are used.

Figure 29:
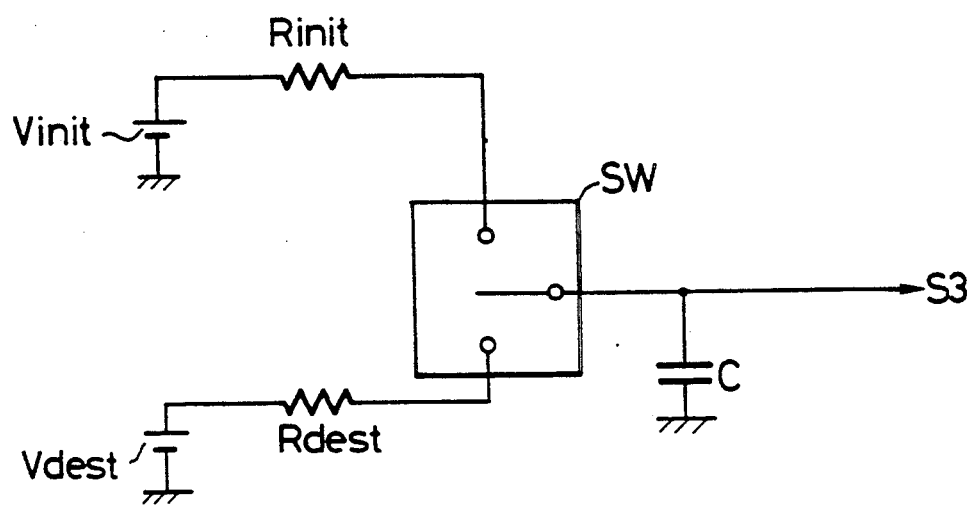
FIG. 29 is a detailed diagram for one possible configuration of a grain control circuit to be equipped to the differential function converter in the neurons of FIGS. 14 and 15.
Figure 30:
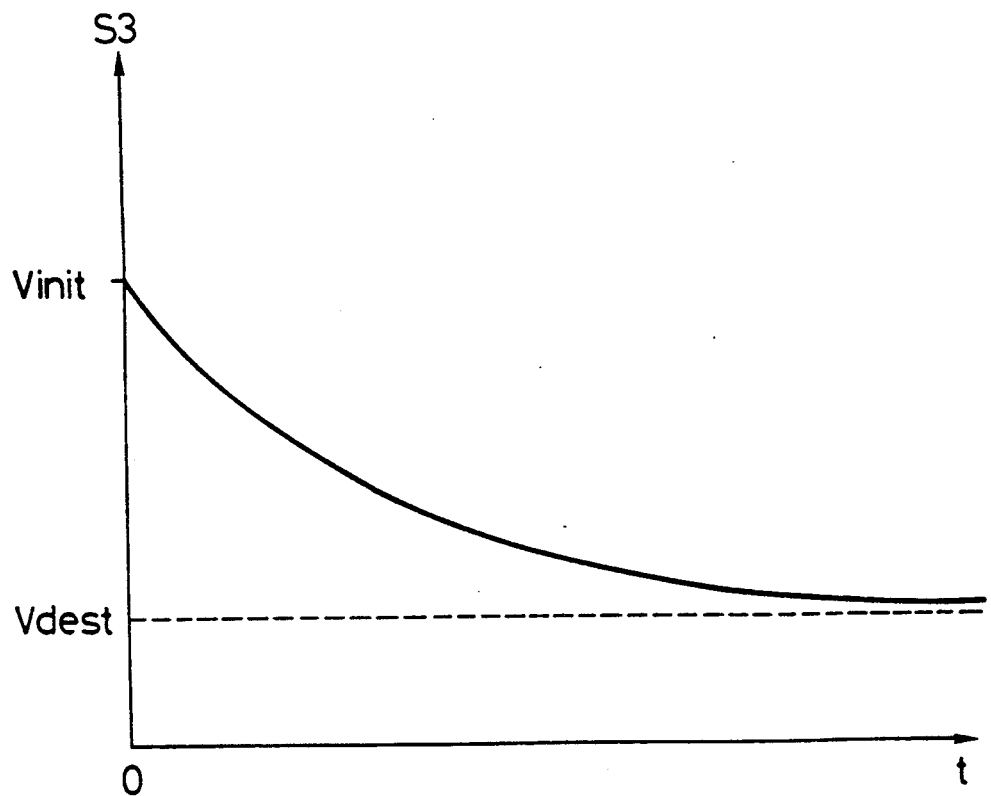
FIG. 30 is a graph qualitatively showing a curve for a bias voltage obtained by the gain control circuit configuration of FIG. 29.

In addition, it is necessary to incorporate a gain control circuit for each function converter 42 and differential function converter 43 in the above embodiment. More specifically, the differential function converter 43 can be equipped with an RC circuit configuration shown in FIG. 29 which comprises two resisters $R_{init}$ and $R_{dest}$ connected to voltage sources $V_{init}$ and $V_{dest}$, respectively, either one of which can be connected with a capacitor C through a switch Sw, an output of which is to be supplied as the bias voltage S3. The values of $R_{init}$, $V_{init}$, $R_{dest}$, $V_{dest}$, and C are set to be such that when the $R_{init}$ and $V_{init}$ are connected with C at the beginning of the self-learning process, $\theta$ starts off at a value larger than a desired value, and then when the $R_{dest}$ and $V_{dest}$ are connected with C as the process progresses, $\theta$ approaches the desired value. In this configuration of FIG. 29, $\theta$ can be changed exponentially during the self-learning process, as shown in FIG. 30.

Figure 31:
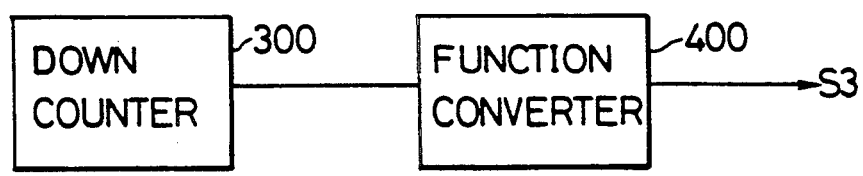
FIG. 31 is a detailed diagram for another possible configuration of a gain control circuit to be equipped to the differential function converter in the neurons of FIGS. 14 and 15.
Figure 32:
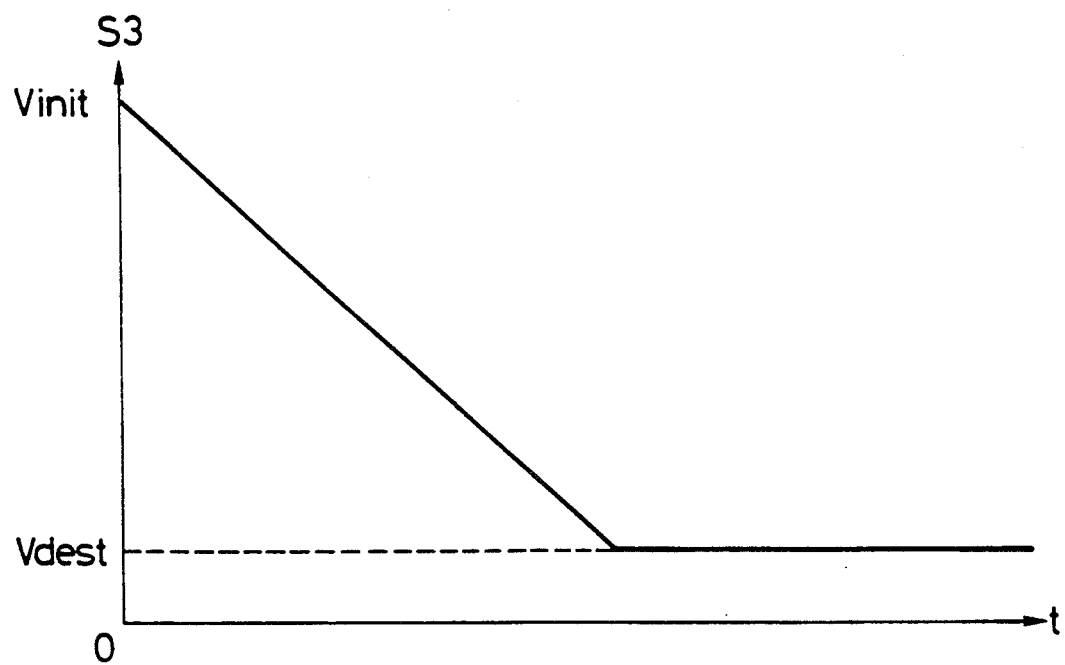
FIG. 32 is a graph qualitatively showing a curve for a bias voltage obtained by the grain control circuit configuration of FIG. 31.

Alternatively, the function converter 42 and the differential function converter 43 can be equipped with a digital circuit shown in FIG. 31 which comprises a down counter 300 which down counts from a number corresponding to initial value for $\theta$ to another number corresponding to final desired value for $\theta$, and a function converter which converts the counted number given by the down counter 300 by a prescribed non-decreasing function to a corresponding bias voltage S3. In this configuration of FIG. 30, $\theta$ can be changed linearly during the self-learning process, as shown in FIG. 32.

Figure 5:
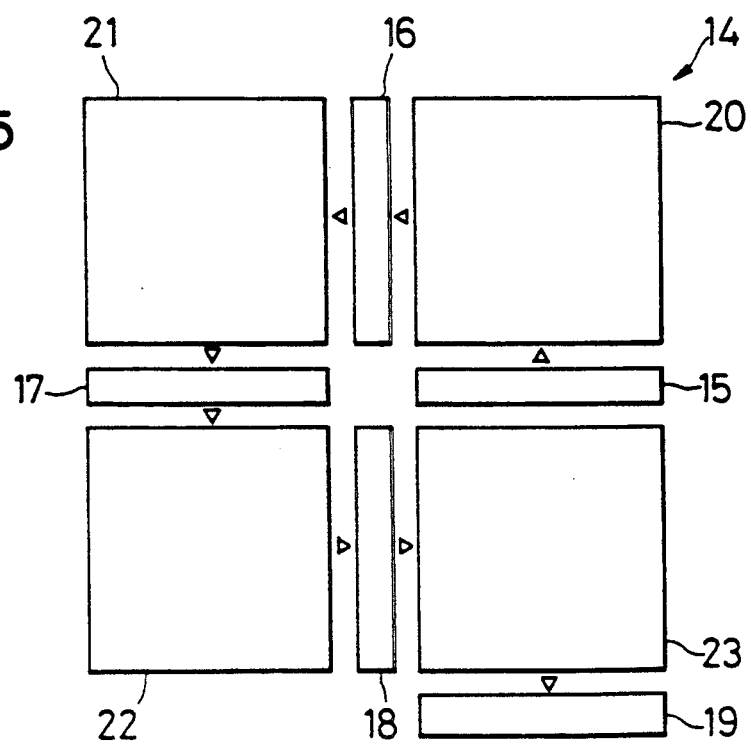
FIG. 5 is a diagrammatic illustration of another specific configuration of the multi-layer perceptron circuit device using the embodiment of FIG. 2.

Moreover, an entire configuration shown in FIG. 5 may be changed as follows.

Figure 33:
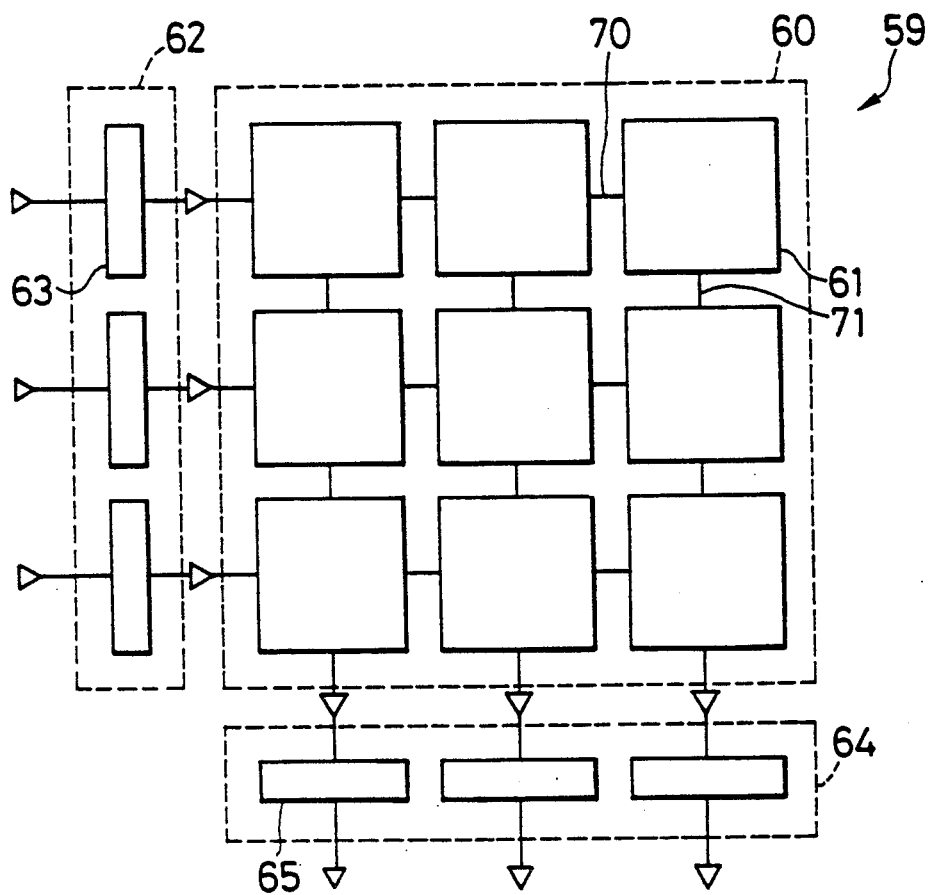
FIG. 33 is a diagrammatic illustration of still another specific configuration of the multi-layer perceptron circuit device using the embodiment of FIG. 2.

FIG. 33 shows a multi-layer perceptron circuit device 59 which comprises a synapse blocks 60 containing n×m (3×3 in FIG. 33 for clarity) unit synapse blocks 61 each of which is substantially equivalent to the synapse block 23 in the above embodiment, an input neuron block 62 containing n (3 in FIG. 33) unit neuron blocks 63 each of which is substantially equivalent to the input neuron block 18 in the above embodiment, and an output neuron block 64 containing m (3 in FIG. 33) unit neuron blocks 65 each of which is substantially equivalent to the output neuron block 19 in the above embodiment, all of which are arranged on a wafer. This configuration is arranged in analogy with FIG. 6, with the synapses and neurons in the configuration of FIG. 6 being replaced by unit synapse blocks and unit neuron blocks, respectively. Also, there are input signal lines 70 and output signal lines 71 joining the unit synapse blocks 61. By constructing the multi-layer perceptron circuit device in such an integrated manner, the limitation on size of the multi-layer perceptron circuit device due to a limit on a possible number of elements that can be integrated together in one circuit can be eliminated. It is to be noted that in this configuration of FIG. 33, each of the synapse blocks 61 is equipped with the current-voltage converter means similar to the current-voltage converter 41 in the above embodiment, so that the input signal lines 70 and the output signal lines 71 do not need to be equipped by such current-voltage converter means. Thus, when the configuration of FIG. 33 is to be further extended, those shown in FIG. 33 need not be altered at all. Similar remarks also applies with respect to the signal dissipation compensator means 55 of the above embodiment.

It is to be noted that in this configuration of FIG. 33, the neuron blocks 62 and 64 may be divided into a number of separate blocks. In such a case, the synapse block 61 need not be arranged on a single wafer.

It should also be obvious that the geometrical shape of these embodiments described so far can be altered as desired, without departing from the present invention.

Besides these, many modifications and variations of the above embodiments may be made without departing from the novel and advantageous features of the present invention. Accordingly, all such modifications and variations are intended to be included within the scope of the appended claims.

What is claimed is:

1. A multi-layer perceptron circuit device with a learning function, comprising:
   (a) at least one tilting synapse block including
      (i) a plurality of synapses for performing a weight calculation on synapse input signals to obtain synapse output signals;
      (ii) synapse input signal lines for transmitting the synapse input signals to the synapses;
      (iii) synapse output signal lines for transmitting the synapse output signals from the synapses;
      (iv) synapse error signal input lines for transmitting synapse error input signals to the synapses;
      (v) learning means for updating values of weights utilized in weight calculations by a product of synapse error input signals and the synapse input signals;
      (vi) synapse error signal output lines for transmitting synapse error output signals from the synapses; and
      (vii) means for calculating the synapse error output signals as a product of the synapse error input signals and the weights;
   (b) at least one tiling input neuron block containing a plurality of neurons, each neuron of the at least one tiling input neuron block being connected with one of the synapse input signal lines by its signal output, inputting one of a plurality of perceptron input signals by its signal input, and supplying one of the synapse input signals to one of the synapse input signal lines, each neuron of the tiling input neuron blocks being connected to one of the synapse error signal output lines by its error signal input, receiving one of the synapse error output signals from one of the synapse error signal output lines, and outputting one of a plurality of perceptron error signals by its error signal output, wherein each of the neurons of the tiling input neuron blocks further includes (i) differential function converter means for converting one of the perceptron input signals into a converted signal using a nonlinear function, the differential function converter means including first and second transistors, each having a first, second, and third terminal, the first terminals connected to a first voltage source, and their second terminals connected together to form a first output terminal, the first transistor receiving an externally supplied first input signal representing a function at its third terminal and the second transistor receiving an externally supplied second input signal representing a complement of the function such that an output signal at the first output terminal represents a derivative of the function;

load means connected between the first output terminal and a second voltage source for loading the first output terminal;

reference voltage generator means connected between the first voltage source and the second voltage source for generating a DC offset voltage; and a second output terminal connected to the reference voltage generator means; and (ii) means for obtaining one of the perceptron error signals from one of the synapse error output signals transmitted through one of the synapse error signal output lines and the converted signal obtained by the differential function converter means; and (c) at least one tiling output neuron block containing a plurality of neurons, each neuron of the tiling output neuron blocks being connected with one of the synapse output signal lines by its signal input, and receiving one of the synapse output signals from one of the synapse output signal lines, and outputting a perceptron output signal by its signal output, each neuron of the tiling output neuron blocks being connected to one of the synapse error signal input lines by its error signal output, inputting an externally supplied teacher signal by its error signal input, and supplying one of the synapse error input signals to one of the synapse error signal input lines.

2. The multi-layer perceptron circuit device of claim 1, wherein each of the synapses comprises means for carrying out weight calculations on the synapse input signals transmitted through the synapse input signal lines to obtain the synapse output signals outputted through the synapse output signal lines including multiplier means for multiplying one of the synapse input signals transmitted through the synapse input signal lines by a multiplication factor; and voltage source means, connected to the multiplier means, for providing a voltage corresponding to the multiplication factor to multiplier means.

3. The multi-layer perceptron circuit device of claim 1, wherein each of the synapse input signal lines in each tiling synapse block feeds one of the synapse input signals to the synapse through means for converting a current flowing through said each of the synapse input signal lines to a corresponding voltage representing said one of the synapse input signals.

4. The multi-layer perceptron circuit device of claim 1, wherein each of the synapse output signal lines in each tiling synapse block is fed with one of the synapse output signals by the synapse through means for performing an impedance conversion in order to compensate for dissipation of said one of the synapse output signals.

5. The multi-layer perceptron circuit device of claim 1, wherein each of the neurons of the tiling input neuron blocks contains function converter means for converting one of the perceptron input signals into one of the synapse input signals using a monotonous and nonlinear function.

6. The multi-layer perceptron circuit device of claim 5, wherein the function converter means comprises a differential amplifier.

7. The multi-layer perceptron circuit device of claim 1, wherein each of the neurons of the tiling output neuron blocks contains function converter means for converting one of the synapse output signals into one of the perceptron output signals using a monotonous and nonlinear function.

8. The multi-layer perceptron circuit device of claim 7, wherein the function converter means comprises a differential amplifier.

9. The multi-layer perceptron circuit device of claim 1, wherein each of the synapses comprises:

means for carrying out weight calculations on the synapse input signals transmitted through the synapse input signal lines to obtain the synapse output signals outputted through the synapse output signal lines including multiplier means for multiplying one of the synapse input signals transmitted through one of the synapse input signal lines by a multiplication factor; and programmable voltage source means, connected with the multiplier means, for providing a voltage corresponding to the multiplication factor, the voltage being controllably variable.

10. The multi-layer perceptron circuit device of claim 9, wherein the programmable voltage source means includes a pair of RC circuit configurations, connected to the multiplier means, for controlling the voltage corresponding to the multiplication factor.

11. The multi-layer perceptron circuit device of claim 9, wherein the programmable voltage source means includes a pair of combinations of capacitors and a switch inserted between the capacitors, which are connected to the multiplier means, for controlling the voltage corresponding to the multiplication factor.

12. The multi-layer perceptron circuit device of claim 9, wherein the programmable voltage source means includes a pair of combinations of capacitors connected through a switch, and a pair of integrator circuits in which each integrator circuit is connected to one of the pair of combinations through a switch, for controlling the voltage corresponding to the multiplication factor.

13. The multi-layer perceptron circuit device of claim 1, wherein each of the synapse error signal input lines in each tiling synapse block feeds one of the synapse error input signals to the synapse through means for converting a current flowing through said each of the synapse error signal input lines to a corresponding voltage representing said one of the synapse error input signals.

14. The multi-layer perceptron circuit device of claim 1, wherein each of the synapse error signal output lines in each tiling synapse block is fed with one of the synapse error output signals by the synapse through means for performing an impedance conversion in order to compensate for dissipation of said one of the synapse error output signals.

15. The multi-layer perceptron circuit device of claim 1, wherein the first and second input signals are obtained as a pair of complementary output signals of a differential amplifier.

16. The multi-layer perceptron circuit device of claim 1, wherein the reference voltage generator means comprises:
   third and fourth transistors, each having a first, second and third terminal, the third and fourth transistors having their first terminals connected to the first voltage source, and their second terminals connected to each other as well as to the second output terminal, wherein the third terminals of the third and fourth transistors receive first and second reference voltages; and
   additional load means connected between the second output terminal and the second voltage source for loading the second output terminal.

17. The multi-layer perceptron circuit device of claim 1, wherein each of the neurons of the output tiling neuron blocks further comprises:
   differential function converter means for converting one of the synapse output signals transmitted through one of the synapse output signal lines into a converted signal using a monotonous and nonlinear function; and
   means for obtaining one of the synapse error input signals from one of the perceptron output signals, the teacher signals, and the converted signal obtained by the differential function converter means.

18. The multi-layer perceptron circuit device of claim 17, wherein the differential function converter means comprises:
   first and second transistors, each having first, second, and third terminals, the first and second transistors having their first terminals connected to a first voltage source, and their second terminals connected together to form a first output terminal, the first transistor receiving an externally supplied first input signal representing a function at its third terminal and the second transistor receiving an externally supplied second input signal representing a complement of the function such that an output signal at the first output terminal represents a derivative of the function;
   load means connected between the first output terminal and a second voltage source for loading the first output terminal;
   reference voltage generator means connected between the first voltage source and the second voltage source for generating DC offset voltage; and
   a second output terminal connected to the reference voltage generator means.

19. The multi-layer perceptron circuit device of claim 18, wherein the first and second input signals are obtained as a pair of complementary output signals of a differential amplifier.

20. The multi-layer perceptron circuit device of claim 18, wherein the reference voltage generator means comprises:
   third and fourth transistors, each having a first, second, and third terminal, the third and fourth transistors having their first terminals connected to the first voltage source, and their second terminals connected to each other as well as to the second output terminal, wherein the third terminals of the third and fourth transistors receive first and second reference voltages; and
   additional load means connected between the second output terminal and the second voltage source for loading the second output terminal.

* * * * *